(12) United States Patent
Sakikawa et al.

(10) Patent No.: US 7,334,404 B2
(45) Date of Patent: Feb. 26, 2008

(54) PUMP UNIT

(75) Inventors: Shigenori Sakikawa, Amagasaki (JP); Tomoyuki Tsuji, Amagasaki (JP); Shingo Araki, Amagasaki (JP)

(73) Assignee: Kanzaki Kokyukoki Mfg., Co., Ltd., Hyogo (JP)

( * ) Notice: Subject to any disclaimer, the term of this patent is extended or adjusted under 35 U.S.C. 154(b) by 241 days.

(21) Appl. No.: 11/289,464

(22) Filed: Nov. 30, 2005

(65) Prior Publication Data
US 2006/0120885 A1    Jun. 8, 2006

(30) Foreign Application Priority Data
Nov. 30, 2004   (JP) .............................. 2004-345561
Mar. 11, 2005   (JP) .............................. 2005-069894

(51) Int. Cl.
*F16D 31/02* (2006.01)

(52) U.S. Cl. ........................................ 60/486; 60/435

(58) Field of Classification Search .................. 60/435, 60/437, 484, 486, 487; 92/12.2
See application file for complete search history.

(56) References Cited

U.S. PATENT DOCUMENTS 6,772,591 B2 *   8/2004   Ohashi et al. ................ 60/486
6,971,233 B1 *  12/2005   Holder ......................... 60/486
6,988,580 B2 *   1/2006   Ohashi et al. ............... 180/307
7,028,472 B2 *   4/2006   Ohashi et al. ................ 60/486
7,131,268 B2 *  11/2006   Ohashi et al. ................ 60/486
7,231,765 B2 *   6/2007   Kawamura et al. ........... 60/487

FOREIGN PATENT DOCUMENTS

JP        2003-291674        10/2003

* cited by examiner

*Primary Examiner*—Michael Leslie
(74) *Attorney, Agent, or Firm*—Sterne, Kessler, Goldstein & Fox, P.L.L.C.

(57) ABSTRACT

There is provided a pump unit including a housing, a first and a second pump shafts, a first and a second hydraulic pump main bodies, a first and a second trunnion type movable swash pates, and a first and a second transmission gears. The housing has an inlet port for introducing oil from the outside into its pump accommodating chamber, an oil passage for communicating between the pump accommodating chamber and its gear accommodating chamber, and a discharge port for taking out oil from the gear accommodating chamber to the outside. The pump accommodating chamber includes a supporting wall that supports each base end of the swash plates so that each operational end of the swash plates is directed to the opposite directions to each other. The inlet port and the oil passage are respectively provided at one side and the other side of the pump accommodating chamber with the supporting wall as a reference.

19 Claims, 24 Drawing Sheets

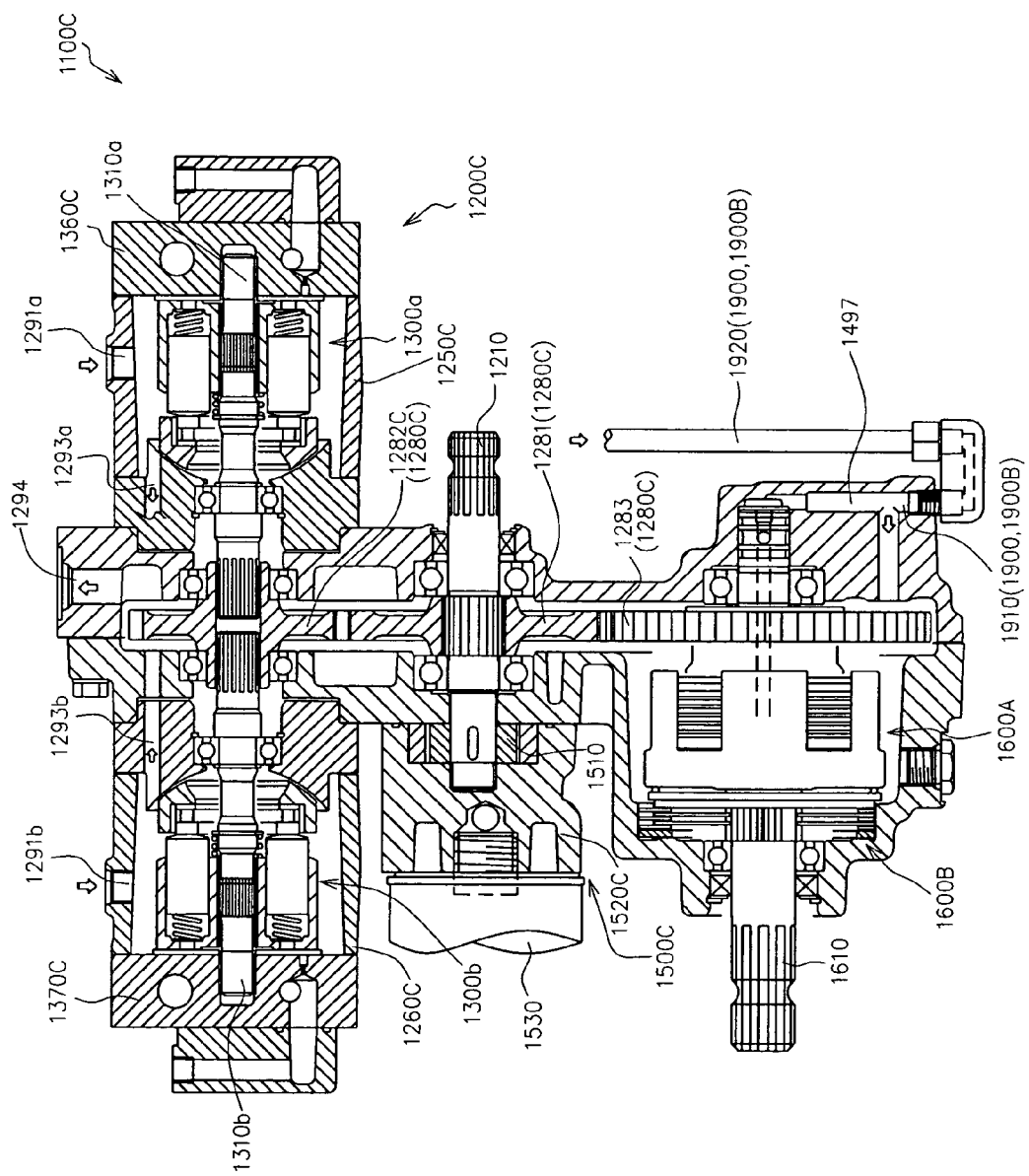

PUMP UNIT

BACKGROUND OF THE INVENTION

1. Field of the Invention

The present invention relates to a pump unit including a pair of hydraulic pump main bodies and a pair of trunnion type movable swash plates which vary supply and discharge oil volume of a pair of pump main bodies.

The present invention also relates to a pump unit including a housing whose oil-storable inner space is divided into a pump accommodating chamber and a gear accommodating chamber.

2. Background Art

A pump unit including multiple pump shafts, multiple hydraulic pump main bodies driven by each of the multiple pump shafts, a housing which accommodates the multiple hydraulic pump main bodies and at the same time supports the multiple pump shafts, and multiple movable swash plates which vary suction/discharge oil quantity has been popularly used in various fields such as working vehicles, etc. (for example, see Japanese Patent Application Laid-open No. 2003-291674).

Now, for the movable swash plate, in general, a trunnion type movable swash plate and a cradle type movable swash plate exist.

The trunnion type movable swash plate has a pair of shafts and a swash plate located between the pair of shafts, and since there is no need to provide a swash plate receiving portion that slidably holds the swash plate, no large force is required for operation but at the same time, a construction to support the pair of shafts at both ends thereof must be equipped to the housing, the trunnion type movable swash plate has a disadvantage of increasing the size of the housing.

In addition, the housing is in general configured to store oil so that the multiple hydraulic pump main bodies are cooled by oil introduced, but no thoroughgoing consideration was made for improving the capability of cooling the hydraulic pump main body by circulating oil inside the housing.

The present invention has been made in view of the foregoing conventional technique and it is one of the objects of the present invention to provide a pump unit including a pair of hydraulic pump main bodies, a pair of trunnion type movable swash plates that vary the suction/discharge oil quantity of the pair of hydraulic pump main bodies, respectively, and a housing that can store oil and accommodates the pair of hydraulic pump main bodies, the pump unit improving the cooling efficiency of the hydraulic pump main body by the oil introduced into the housing while preventing an increase of the housing size.

In addition, a pump unit having a housing whose oil-storable inner space is divided into a pump accommodating chamber for accommodating a hydraulic pump main body and a gear accommodating chamber for accommodating a gear train has been used in various fields such as working vehicles, etc. (for example, see Japanese Patent Application Laid-open No. 2003-291674 mentioned above).

Such a conventional pump unit is useful in that the inner space of the housing can be used as oil storage and at the same time the hydraulic pump main body can be cooled by the stored oil while entry of impurities such as iron powder, etc. generated from the gear train into the pump accommodating chamber can be prevented or reduced.

However, for the conventional pump unit, thoroughgoing consideration was not made on improving the cooling efficiency of the hydraulic pump main body by circulating the stored oil inside the housing.

In addition, the oil stored in the housing gives rise a rotational resistance against rotating bodies such as the gear train, hydraulic pump main body, and so on.

With respect to this point, thoroughgoing consideration is not given to conventional pump units, either.

The present invention is made in light of the above-mentioned conventional technique, and it is another object of the present invention to provide a pump unit which is equipped with a housing whose inner space is designed to store oil, the pump unit preventing stagnation or pooling at the same position of oil stored in the housing and improving the cooling efficiency of the pump main body contained in the housing.

It is still another object of the present invention to improve the transmission efficiency of the gear train as much as possible by reducing the rotational resistance against the gear train due to the stored oil, while the above-mentioned object is being obtained.

BRIEF SUMMARY OF THE INVENTION

According to one aspect of the present invention, there is provided a pump unit including; a housing which has an oil-storable inner space, the oil-storable inner space being divided into a pump accommodating chamber and a gear accommodating chamber by a partition wall; a first and a second pump shafts supported by the housing so as to cross over the gear accommodating chamber and the pump accommodating chamber in the condition parallel to each other; a first and a second hydraulic pump main bodies supported by the first and the second pump shafts, respectively, in such a manner to be located in the pump accommodating chamber; a first and a second trunnion type movable swash pates that respectively vary the suction/discharge amount of the first and the second hydraulic pump main bodies, the first and the second trunnion type movable swash plates being supported by the housing in such a manner to be operatable from outside; and a first and a second transmission gears respectively supported by the first and the second pump shafts in a relatively non-rotatable manner so as to be located in the gear accommodating chamber.

In the thus pump unit, the housing has an inlet port for introducing oil from outside into the pump accommodating chamber, an oil passage for communicating between the pump accommodating chamber and the gear accommodating chamber, and a discharge port for taking out oil from the gear accommodating chamber to outside. The pump accommodating chamber includes a supporting wall that supports each base end of the first and the second trunnion type movable swash plates so that each operational end of the first and the second trunnion type movable swash plates is directed to the opposite directions to each other. The inlet port and the oil passage are respectively provided at one side and the other side of the pump accommodating chamber with the supporting wall as a reference, so that oil introduced from the outside into the housing is flown from the one side of the pump accommodating chamber to the gear accommodating chamber via the other side of the pump accommodating chamber, and then is discharged to outside from the gear accommodating chamber.

With this configuration, it is possible to reduce the size of the pump unit as much as possible while obtaining advantages of low operating force by a pair of trunnion type swash plates.

In addition, since the pump unit is configured in such a manner that the oil introduced into the housing is discharged to the outside from one side of the pump accommodating chamber with the partition wall used as a reference via the other side of the pump accommodating chamber and the gear accommodating chamber, the first and the second hydraulic pump main bodies can be efficiently cooled by the oil introduced into the housing.

Furthermore, according to the pump unit, since the oil flow from pump accommodating chamber to gear accommodating chamber is formed, it is possible to effectively prevent impurities such as iron powders, etc. generated from the first and the second transmission gears inside the gear accommodating chamber from flowing into the pump accommodating chamber.

In one embodiment, the housing may include a housing main body with an opening which is communicated with the pump accommodating chamber and through which the first and the second hydraulic pump main bodies can be inserted, and a plate member which is removably coupled to the housing main body so as to close the opening and in which suction/discharge passages to the first and the second hydraulic pump main bodies are formed.

The supporting wall is integrally formed with the partition wall. A communicating passage which fluidly communicates the one side with the other side of the pump accommodating chamber is formed so as to be positioned between a free end of the supporting wall and the plate member.

Preferably, the communicating passage is formed by a groove provided at the free end of the supporting wall in such a manner to be opened toward the plate member. And at least part of the free end of the supporting wall is configured to come in contact with the plate member.

In the above various configurations, in a case that the housing is supported by a supporting member in such a manner that the first and the second pump shafts extend along the horizontal direction, it is preferable that the oil passage is provided at a position higher than the pump shafts in a state that the housing is supported by the supporting member.

In the above various configurations, the pump unit may further includes a pair of control arms which are respectively coupled to the operational ends of the first and the second trunnion type movable swash plates; and a pair of neutral return springs disposed between each of the pair of control arms and the housing in such a manner as to return the corresponding control arms to the neutral position.

In a case that the first and the second hydraulic pump main bodies are respectively fluidly connected to a pair of hydraulic motor units which drives driving wheels and which are disposed away from the housing, and the pair of control arms are mechanically linked to a pair of right and left operating levers which are disposed near the vehicle driving seat, respectively, the pair of neutral return springs are so configured that they do not perform the neutral return action when the corresponding operating levers are operated in the vehicle forward travel direction and perform the neutral return action only when the corresponding operating levers are operated in the vehicle rearward travel direction.

More preferably, the pump unit further includes movable pins provided at the pair of control arms; and fixed pins disposed radially outwards of the movable pin with the corresponding operating axis as a reference. The neutral return spring is a helix spring which is directly or indirectly wrapped around the operational end of the trunnion type movable swash plate. The neutral return spring has a first end and a second end which extend radially outwards with the operating axis of the trunnion type movable swash plate as a reference. The neutral return spring is so configured that the first end and the second end engage the corresponding movable pin so as to hold the movable pin therebetween, and only one of the first end or the second end engages with the corresponding fixed pin.

According to another aspect of the present invention, there is provided a pump unit including; a housing which has an oil-storable inner space, the oil-storable inner space being divided into a pump accommodating chamber and a gear accommodating chamber by a partition wall; a hydraulic pump main body accommodated in the pump accommodating chamber; and a gear train accommodated in the gear accommodating chamber.

In the thus pump unit, the housing has an inlet port for introducing oil from the outside into the pump accommodating chamber, an oil passage for flowing the oil from the pump accommodating chamber into the gear accommodating chamber, and a discharge port for taking out the oil in the gear accommodating chamber to the outside.

With this configuration, it is possible to prevent the stored oil from stagnating or pooling at the same position by efficiently circulating the stored oil inside the housing.

Consequently, it is possible to efficiently cool the hydraulic pump main body accommodated in the pump accommodating chamber.

In addition, since the oil flow from the gear accommodating chamber to the pump accommodating chamber can be prevented, it is possible to effectively prevent impurities such as iron powders, etc. from the gear train accommodated in the gear accommodating chamber from exerting detrimental effects on the hydraulic pump main body.

According to still another aspect of the present invention, there is provided a pump unit including; a housing which has an oil-storable inner space, the oil-storable inner space being divided into a pump accommodating chamber and a gear accommodating chamber by a partition wall; a first and a second pump shafts supported by the housing in such a manner cross over the pump accommodating chamber and the gear accommodating chamber; a first and a second hydraulic pump main bodies respectively supported by the first and the second pump shafts in such a manner as to be located in the pump accommodating chamber; and a gear train accommodated in the gear accommodating chamber.

In the thus pump unit, the housing has an inlet port for introducing oil from the outside into the pump accommodating chamber, an oil passage for flowing the oil from the pump accommodating chamber into the gear accommodating chamber, and a discharge port for taking out the oil inside the gear housing chamber to the outsides.

According to the thus pump unit, the above effects could be obtained.

In a case that the first and second hydraulic pump bodies are disposed in parallel to each other, the housing may have a dividing wall dividing the pump accommodating chamber into a first pump space and a second pump space in such a manner that the both pump spaces are fluidly communicated with each other. The inlet port is disposed in one of the first and the second pump spaced, and the oil passage is disposed in the other of the first and the second pump spaces.

According to this configuration, both the first and the second hydraulic pump main bodies disposed in parallel to each other can be efficiently cooled.

In a case that the first and second hydraulic pump bodies are disposed in series to each other, the pump accommodating chamber may be so configured to include a first pump accommodating chamber and a second pump accommodating chamber which are respectively disposed at one side and the other side in the axial direction of the first and the second pump shafts with the gear accommodating chamber in-between. The inlet port is so configured to include a first and a second inlet ports for introducing oil from the outside into the first pump accommodating chamber and the second pump accommodating chamber, respectively. And the oil passage is so configured to include a first and a second passages for introducing the oil from the first and the second pump accommodating chambers into the gear accommodating chamber, respectively.

In this configuration, both the first and the second hydraulic pump arranged in series to each other can be efficiently cooled.

In the above various configurations, the pump unit preferably includes a PTO shaft supported by the housing; and a PTO clutch mechanism which selectively connects/disconnects power transmission from the gear train to the PTO shaft. The housing is so configured to have a PTO accommodating chamber which communicates with the gear accommodating chamber.

In the above various configurations, preferably, the oil passage is provided at a position where the oil flow from the pump accommodating chamber into the gear accommodating chamber is performed through the use of pump action by at least one gear that forms the gear train.

In the above various configurations, preferably, the pump unit further includes an air intake mechanism which takes air into the gear accommodating chamber through the use of pump action by at least one gear that forms the gear train.

With this configuration, the amount of stored oil in the gear accommodating chamber can be reduced without equipping any additional members.

Consequently, it is possible to reduce the rotational resistance arising from the stored oil against the gear train, thereby improving the transmission efficiency of the gear train while the above-mentioned effects are being obtained.

More preferably, the air intake mechanism may be configured to utilize the pump action by a gear located at the lowermost position in a state that the pump unit is in a mounted condition, out of the gears that forms the gear train.

With this configuration, the amount of stored oil can be reduced throughout the whole area inside the gear accommodating chamber, thereby much more effectively improving the transmission efficiency of the gear train.

The air intake mechanism may have an air intake port provided in the housing in such a manner as to communicate the gear accommodating chamber with the outside, and a tubular member which has a base end connected to the air intake port. The tubular member is so configured to have a portion higher than the oil level of a reserve tank fluidly connected to the discharge port, in a state that the one gear is not rotated.

According to this configuration, it is possible to effectively prevent the stored oil in the gear accommodating chamber from flowing out to the outside in the event that a working vehicle equipped with the pump unit is inclined on the sloping ground, etc.

Preferably, the air intake mechanism may have an air intake port provided in the housing in such a manner as to communicate the gear accommodating chamber with the outside, and a tubular member which has a base end connected to the air intake port and a tip end connected to an air layer of a reserve tank fluidly connected to the discharge port.

With this configuration, intake of air into the gear accommodating space can be carried out in an closed space.

Consequently, it is possible to definitely prevent the stored oil in the gear accommodating chamber from flowing out to the outside.

More preferably, the air intake mechanism further includes a one-way valve that allows intake of air into the gear accommodating chamber via the air intake port while preventing outflow of oil from the gear accommodating chamber via the air intake port.

With this configuration, it is possible to definitely prevent the stored oil in the gear accommodating chamber from flowing out to the outside.

In the above various configurations, the air intake mechanism may further have a filter which prevents a foreign matter from being sucked from the outside into the gear accommodating chamber.

With this configuration, it is possible to effectively prevent the impurities from entering in the housing.

BRIEF DESCRIPTION OF THE DRAWINGS/FIGURES

The above, and other objects, features and advantages of the present invention will become apparent from the detailed description thereof in conjunction with the accompanying drawings wherein.

FIG. 24 is a longitudinal cross-sectional side view f a pump unit of a fourth embodiment according to the present invention.

DETAILED DESCRIPTION OF THE INVENTION

First Embodiment

Referring now to the accompanying drawings, one preferred embodiment of a pump unit according to the present invention will be described in detail hereinafter.

Figure 1:
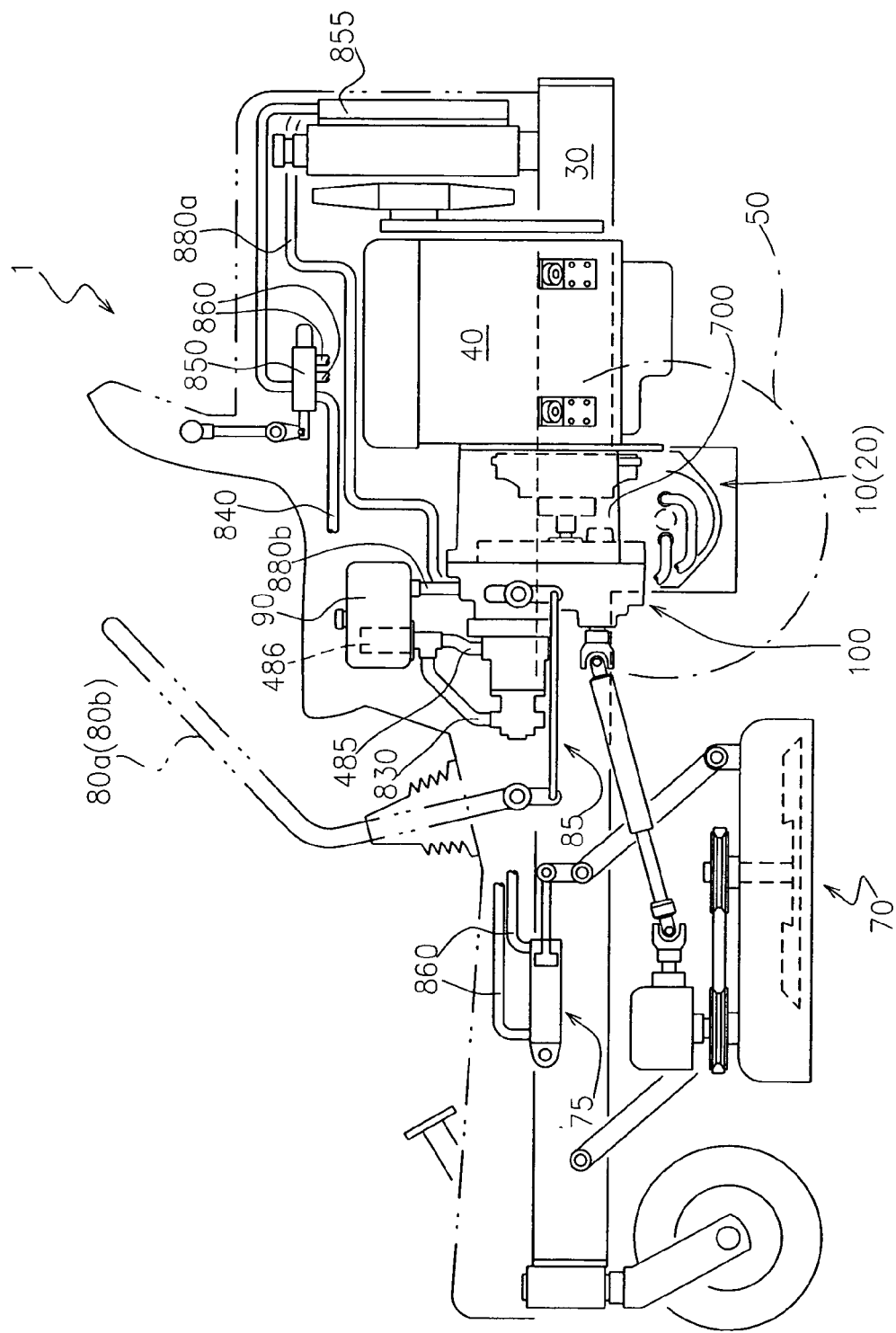
FIG. 1 is a schematic side view of a working vehicle to which a pump unit of a first embodiment according to the present invention is applied.
Figure 2:
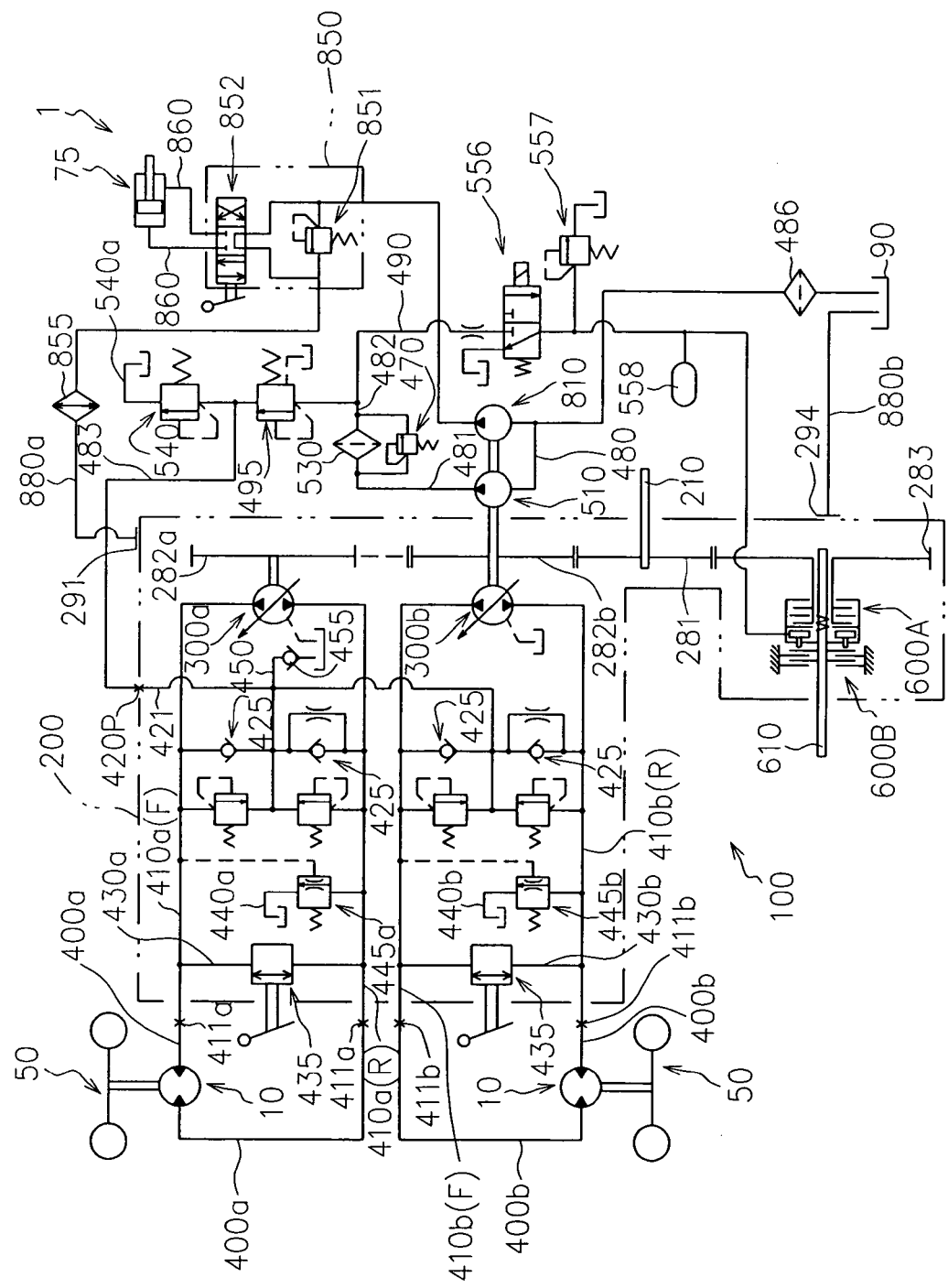
FIG. 2 is a hydraulic circuit diagram of the working vehicle of the first embodiment.

FIGS. 1 and 2 are a schematic side view and a hydraulic circuit diagram of a working vehicle 1 to which a pump unit 100 of the present embodiment is applied, respectively.

Figure 3:
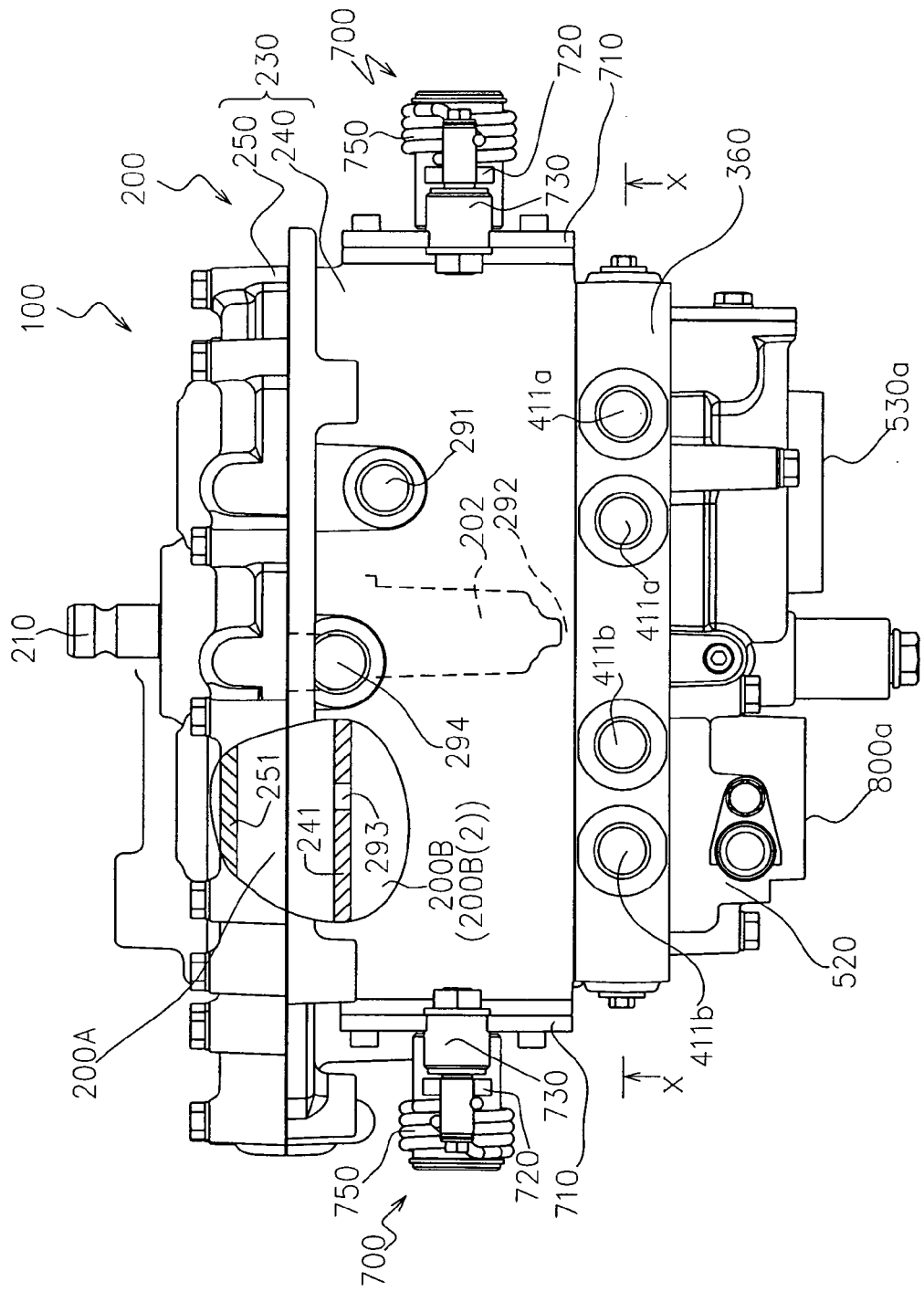
FIG. 3 is a plan view of the pump unit of the first embodiment.
Figure 4:
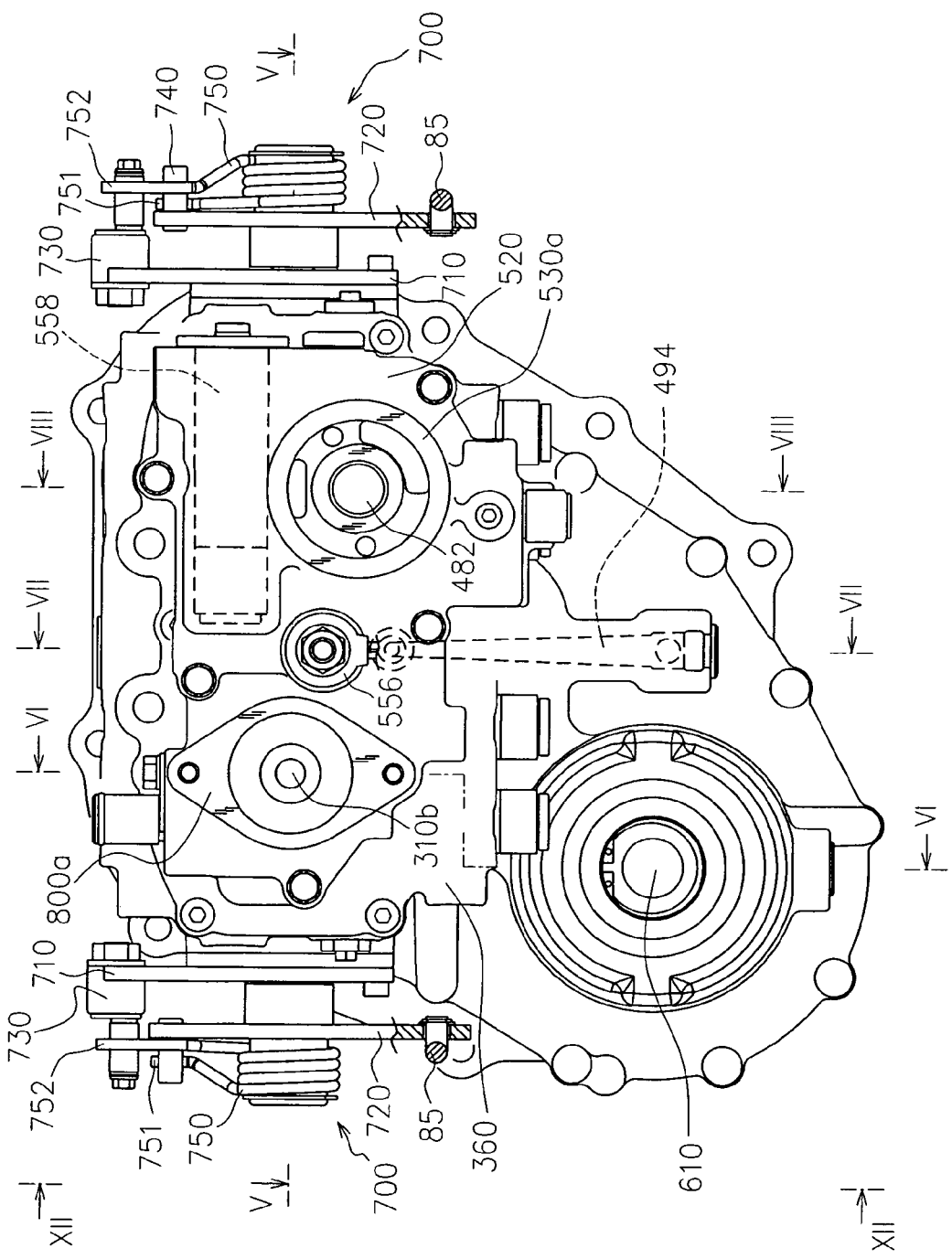
FIG. 4 is a front view of the pump unit of the first embodiment.

In addition, FIGS. 3 and 4 are a plan view and a front view of the pump unit 100 of the present embodiment, respectively.

As shown in FIGS. 1 and 2, the working vehicle 1 includes a driving source 40 mounted at the rear region of a vehicle frame 30, the pump unit 100 operatively connected to the driving source 40, a pair of first and second hydraulic motor units 10, 20 fluidly connected to the pump unit 100, and a pair of right and left driving wheels 50 which are driven by the pair of first and second hydraulic motor units 10, 20, respectively.

That is, the pump unit 100 is so configured to form a traveling-system variable-speed transmission mechanism in cooperation with the pair of the first and the second hydraulic motors 10, 20 equipped to the working vehicle 1.

Specifically, as shown in FIG. 2, the pump unit 100 includes a first hydraulic pump main body 300a fluidly connected to the first hydraulic motor unit 10 via a pair of first operating oil line 400a, a second hydraulic pump main body 300b fluidly connected to the second hydraulic motor unit 20 via a pair of second operating oil line 400b, a first and a second trunnion type swash plates 350a, 350b which vary suction/discharge oil quantity of the first and the second hydraulic pump main bodies 300a, 300b, respectively. The first hydraulic pump main body 300a and a hydraulic motor main body in the first hydraulic motor unit 10 form a first HST, and the second hydraulic pump main body 300b and a hydraulic motor main body in the second hydraulic motor unit 20 form a second HST.

Incidentally, in the present embodiment, the first and the second hydraulic motor units 10, 20 are of a fixed displacement type (see FIG. 2), but they may be of a variable displacement type.

FIGS. 5 to 8 are cross-sectional views taken along lines V-V, VI-VI, VII-VII, and VIII-VIII in FIG. 4, respectively.

As shown in FIGS. 3 to 8, the pump unit 100 includes a housing 200, a first and a second pump shafts 310a, 310b supported by the housing 200 in a rotatable manner about its axis, the first and the second hydraulic pump main bodies 300a, 300b rotatably driven by the first and the second pump shafts 310a, 310b, respectively, the first and the second trunnion type swash plates 350a, 350b, and a first and a second transmission gears 282a, 282b supported by the first and the second pump shafts 310a, 310b in a relatively non-rotatable manner to rotate the first and the second pump shafts 310a, 310b in synchronism.

The housing 200 is designed to be directly or indirectly supported by a supporting member such as the vehicle frame 30, etc.

In the present embodiment, the housing 200 is connected to the driving source 40 via a connection case 207 in a free state to the vehicle frame 30 (see FIG. 1).

That is, as shown in FIG. 1, the driving source 40 is oscillatably supported to the vehicle frame 30 via rubber vibration isolator, and the housing 200 is connected to the driving source 40 via the connection case 207 in the free state to the vehicle frame 30 so that the housing can be oscillated integrally with the driving source 40.

Figure 5:
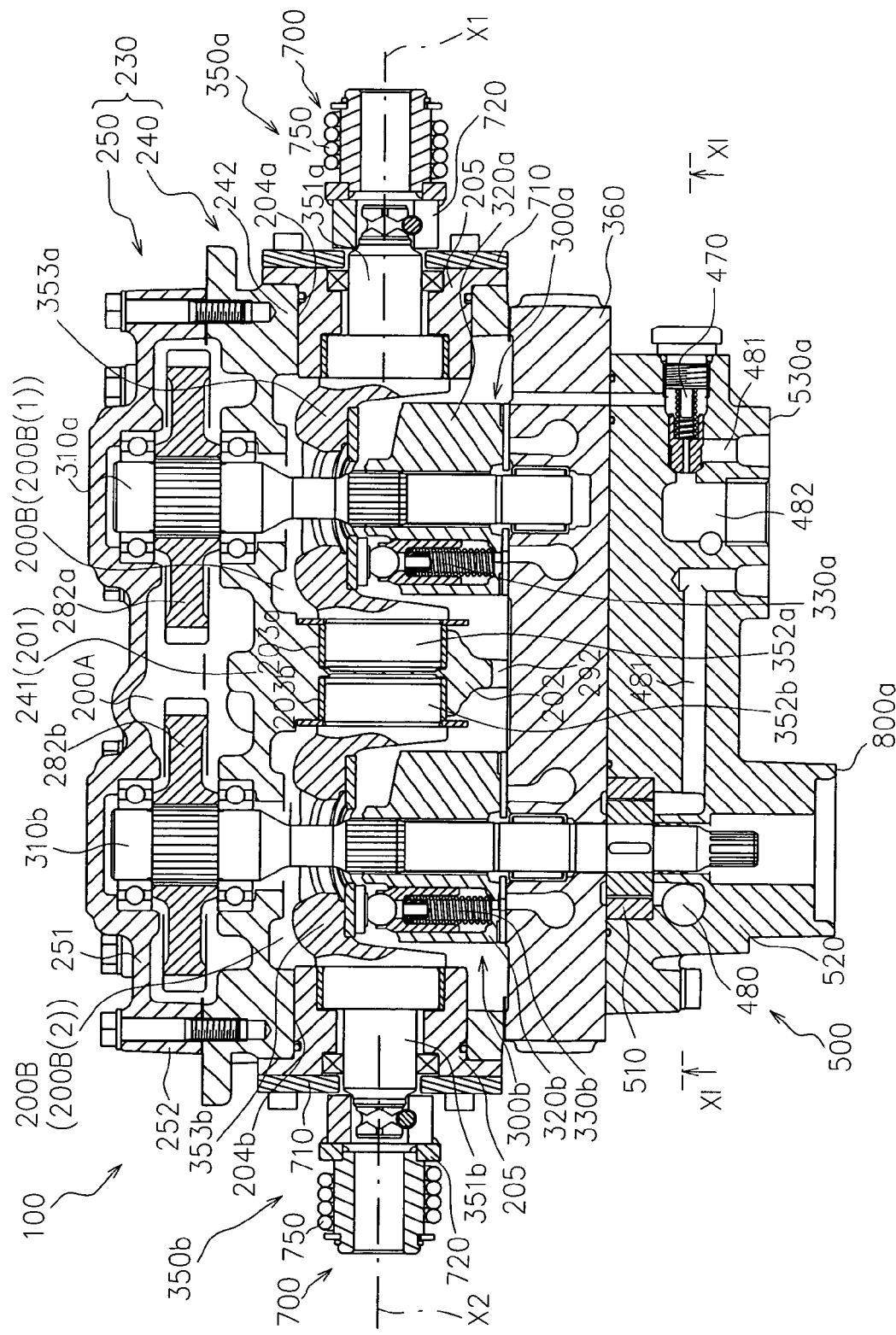
FIG. 5 is a cross-sectional view of the pump unit, taken along a line V-V in FIG. 4.
Figure 6:
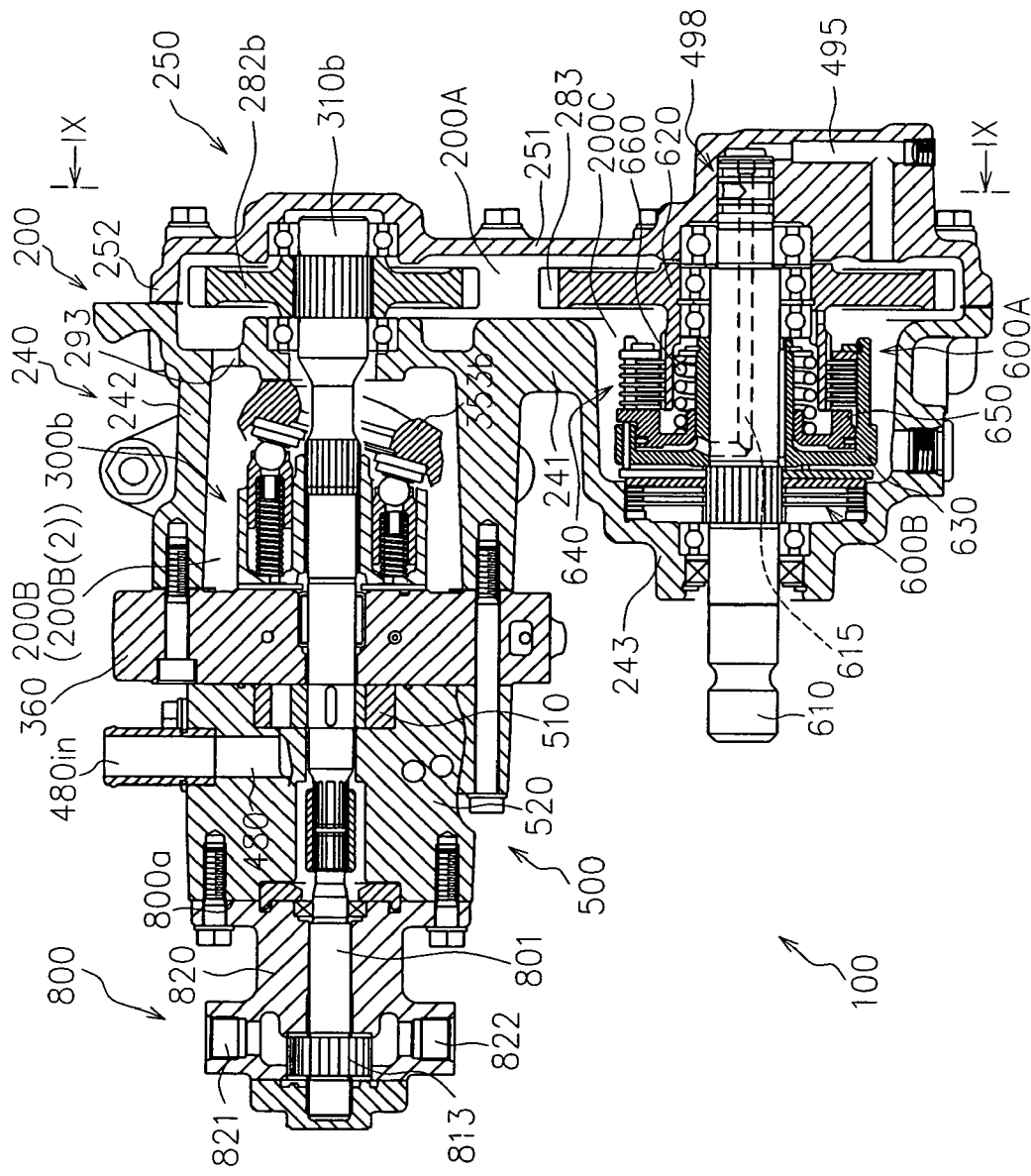
FIG. 6 is a cross-sectional view of the pump unit, taken along a line VI-VI in FIG. 4.
Figure 8:
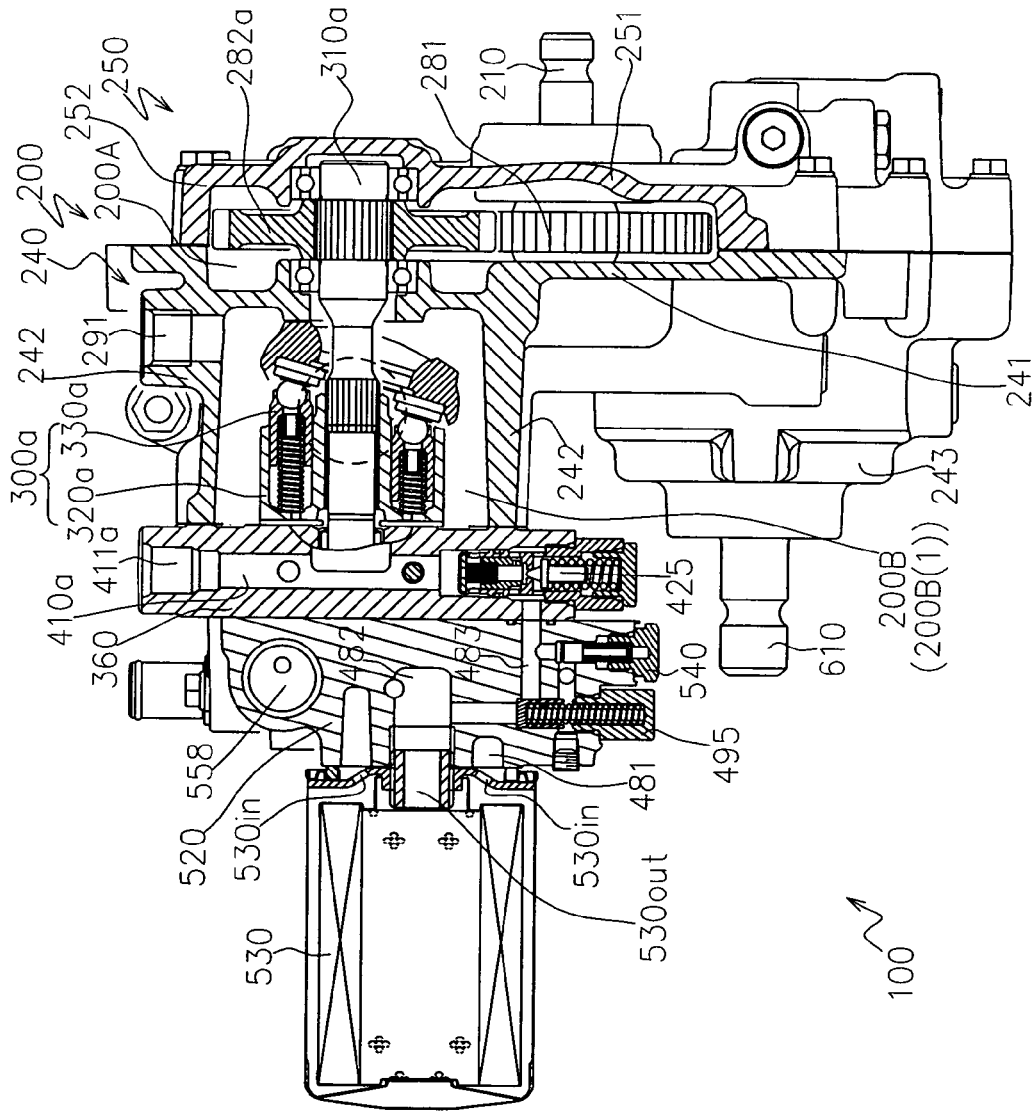
FIG. 8 is a cross-sectional view of the pump unit, taken along a line VIII-VIII in FIG. 4.

As shown in FIGS. 5, 6, and 8, the housing 200 is so configured to support the first and the second pump shafts 310a, 310b and the first and the second trunnion type movable swash plates 350a, 350b, and is also so configured that the oil-storable inner space is divided into a pump accommodating chamber 200B that accommodates the first and the second hydraulic pump main bodies 300a, 300b and a gear accommodating chamber 200A that accommodates the first and the second transmission gears 282a, 282b by a partition wall 201.

In the present embodiment, the housing 200 includes a housing main body 230 and a plate member 360 (center section) which is removably connected to the housing main body 230, the plate member 360 being equipped with suction/discharge passages for the first and the second hydraulic pump main bodies 300a, 300b.

The housing main body 230, as shown in FIGS. 5, 6, and 8, includes a first housing member 240 that forms the pump accommodating chamber 200B in cooperation with the plate member 360, and a second housing member 250 which is removably connected to the first housing member 240 and forms the gear accommodating chamber 200A in cooperation with the first housing member 240.

The first housing member 240 includes a first end wall 241 that extends in the direction orthogonal to the axial direction of the first and the second pump shafts 310a, 310b, and a first peripheral wall 242 that extends from the first end wall 241 along the axial direction of the first and the second pump shafts 310a, 310b. The first housing member 240 is so designed to have an opening at the free end side, opposite to the first peripheral wall 242, of the first end wall 241.

The opening is the size that enables the insertion of the first and the second hydraulic pump main bodies 300a, 300b and is liquid-tightly closed by the plate member 360.

That is, in the present embodiment, the pump accommodating chamber 200B is formed by the first end wall 241, the first peripheral wall 242 and the plate member 360.

The second housing member 250 includes a second end wall 251 which is opposed to the first end wall 241 with a clearance provided in the condition connected to the first housing member 240.

That is, in the present embodiment, the clearance between the first end wall 241 and the second end wall 251 forms the gear accommodating chamber 200A, and the first end wall 241 functions as the partition wall 201 that divides between the pump accommodating chamber 200B and the gear accommodating chamber 200A.

In the present embodiment, the second housing member 250 includes a second peripheral wall 252 that extends from the peripheral edge of the second end wall along the axial direction of the first and the second pump shafts 310a, 310b in addition to the second end wall 251. The second peripheral wall 252 is so designed that its free end is contacted to the first housing member 240.

That is, in the present embodiment, the gear accommodating chamber 200A is formed by the second end wall 251 and the second peripheral wall of the second housing member 250 as well as the first end wall 241 of the first housing member 240.

Incidentally, in the present embodiment, the pump unit 100, as shown in FIGS. 2 and 6, is equipped with a PTO shaft 610 which outputs driving power to the working machine 70 (see FIG. 1) such as a mower device, etc. attached to the working vehicle 1, and a PTO clutch mechanism 600A interposed in a power transmission path from the driving source 40 to the PTO shaft 610.

Specifically, as shown in FIG. 6, the first housing member 240 is designed so that a part of the first end wall 241 is bulged at an area where avoids the first peripheral wall 242.

And the PTO shaft 610 is supported by the bulged portion 243 of the first end wall 241 and the second end wall 251 so that its downstream end in the transmission direction extends outwards from the first end wall 241. The PTO clutch mechanism 600A is accommodated in a PTO chamber 200C formed by the bulged portion 243 of the first end wall 241 and the second end wall 251.

The first and the second pump shafts 310a, 310b are supported by the housing 200 substantially in parallel to each other in a state that the pump shafts 310a, 310b are synchronously rotated by the driving source 40.

Specifically, as shown in FIG. 5, the first and the second pump shafts 310a, 310b are supported by the second end wall 251 of the second housing member 250, the first end wall 241 of the first housing member 240 and the plate member 360 so as to cross over the gear accommodating chamber 200A and the pump accommodating chamber 200B.

As shown in FIGS. 5 and 8, of the pump shaft 310a, at the portion that falls on the gear accommodating chamber 200A, the first transmission gear 282a is supported, and at the portion that falls on the pump accommodating chamber 200B, the first hydraulic pump main body 300a is supported.

Similarly, as shown in FIGS. 5 and 6, of the second pump shaft 310b, at the portion that falls on the gear accommodating chamber 200A, the second transmission gear 282b is supported, and at the portion that falls on the pump accommodating chamber 200B, the second hydraulic pump main body 300b is supported.

In the present embodiment, the pump unit 100 further includes an input shaft 210 operatively connected to the driving source 400, and an input gear 281 supported on the input shaft 210 in a relatively non-rotatable manner in addition to the above-mentioned configuration. In the pump unit 100, the first and the second pump shafts 310a, 310b are operatively connected to the driving source 40 via the input shaft 210, the input gear 281, the first transmission gear 282a and the second transmission gear 282b.

Figure 9:
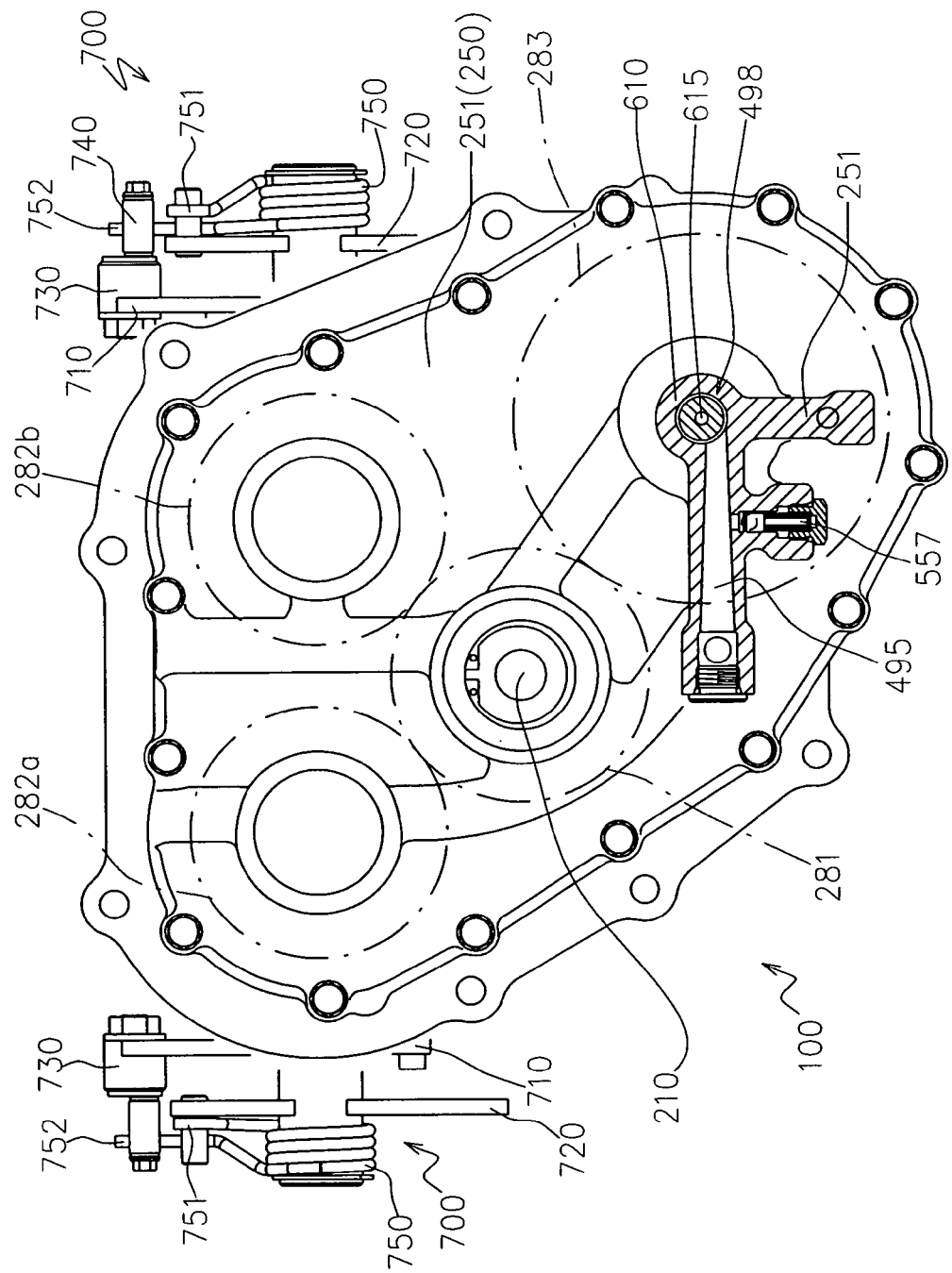
FIG. 9 is a partially cross-sectional view of the pump unit, taken along a line IX-IX in FIG. 6.

FIG. 9 is a partially cross-sectional view of the pump unit 100 taken along a line IX-IX in FIG. 6.

Figure 7:
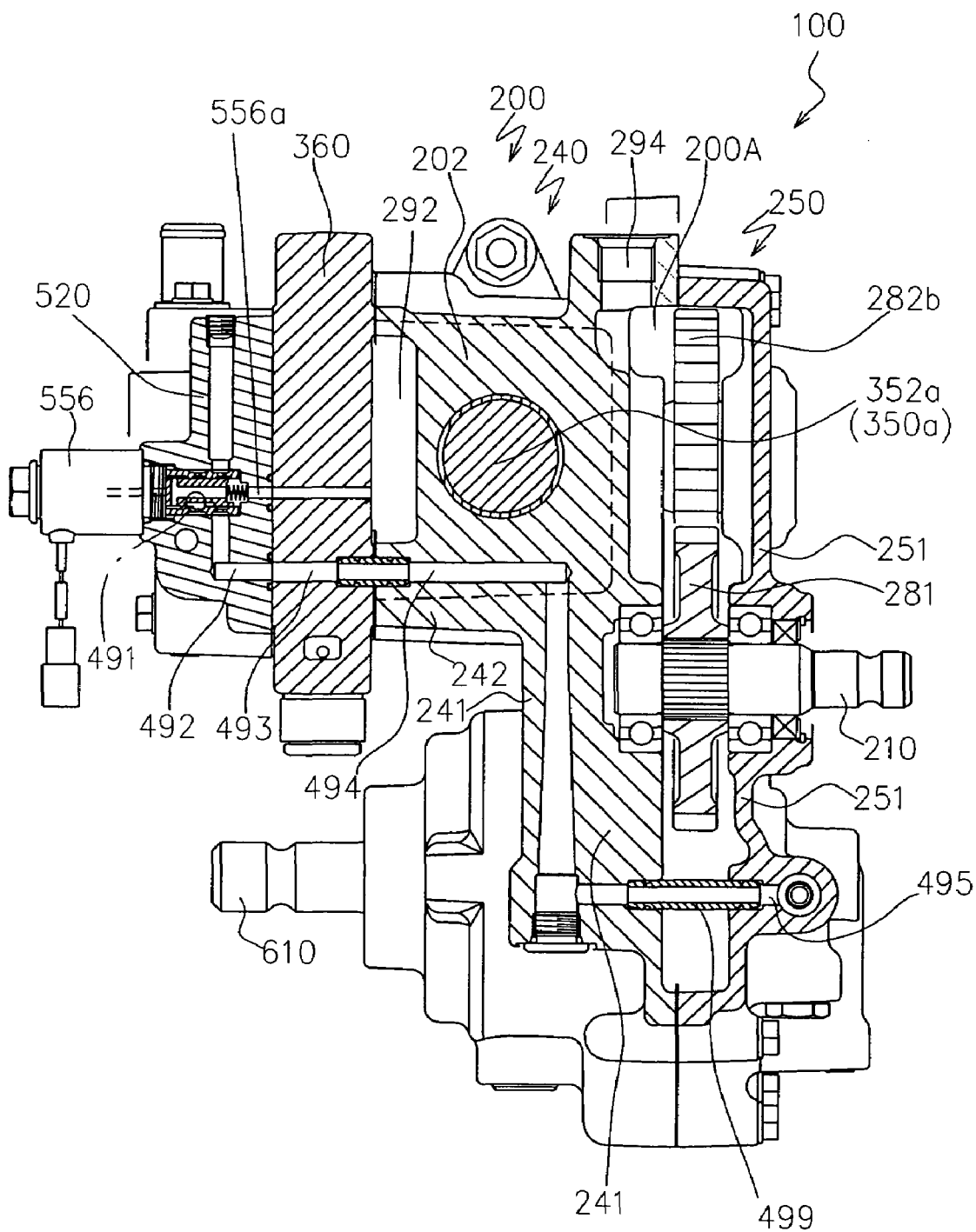
FIG. 7 is a cross-sectional view of the pump unit, taken along a line VII-VII in FIG. 4.

As shown in FIG. 7, the input shaft 210 is supported by the second end wall 251 and the first end wall 241 in such a manner that its one end protrudes outwards.

As shown in FIGS. 7 and 9, the input gear 281 is supported on the input shaft 210 in the relatively non-rotatable manner within the gear accommodating chamber 200A so that the input gear 281 engages with the first and the second transmission gears 282a, 282b.

In the pump unit 100 of the present embodiment, the PTO clutch mechanism 600A inputs the driving power from the driving source 40 via the input gear 281.

That is, the PTO clutch mechanism 600A, as shown in FIGS. 6 and 9, includes a driving-side member 620 which is supported in the relatively rotatable manner to the PTO shaft 610 and which has a PTO gear 283 engaging with the input gear 281, a driven-side member 630 which is supported on the PTO shaft 610 in the relatively non-rotatable manner, a frictional plate group 640 which includes a driving-side frictional plate supported by the driving-side member 620 in the relatively non-rotatable manner and a driven-side frictional plate supported by the driven-side member 630 in the relatively non-rotatable manner, and a push-to-move member 650 which selectively friction-engages the driving-side friction plate and the driven-side friction plate by the hydraulic action. The thus PTO clutch mechanism 600A is so configured that the power transmission from the driving source 40 to the PTO shaft 610 can be contrarily engaged or disengaged by turning ON/OFF the hydraulic action to the press-to-move member 650.

In the present embodiment, the PTO clutch mechanism 600A is a hydraulic operation type in which the power transmission is engaged when oil pressure is supplied, and further includes a biasing member 660 that prevents the friction plate group 640 from being unintentionally engaged when oil pressure is not supplied.

More preferably, the pump unit 100 may be equipped with a PTO brake mechanism 600B that applies braking force to the PTO shaft 610, the PTO brake mechanism 600B being linked with the PTO clutch mechanism 600A so as to work contrarily to the PTO clutch mechanism 600A (see FIGS. 2 and 6).

As described above, in the pump unit 100 of the present embodiment, the input shaft 210 is an independent shaft from the first and the second pump shafts 310a, 310b, but needless to say, it is possible to extend the end of either one of the first and the second pump shafts 310a, 310b outwards from the housing 200, and to use the pump shaft which has the outward extending end section as the input shaft.

The first hydraulic pump main body 300a, as shown in FIGS. 5 and 8, has a first cylinder block 320a supported on the first pump shaft 310a in the relatively non-rotatable manner within the pump accommodating chamber 200B, and a first piston unit 330a accommodated in the first cylinder block 320a in the relatively non-rotatable manner and in the slidable manner in an axial direction.

Incidentally, the second hydraulic pump main body 300b has substantially the same configuration as that of the first hydraulic pump main body 300a. Consequently, detailed description of the second hydraulic pump maim body 300b will be properly omitted by replacing the end reference character "a" of the first hydraulic pump maim body 300a with "b".

The first trunnion type movable swash plate 350a, as shown in FIG. 5, includes a first operational end 351a supported in the relatively rotatable manner on a first operational axis X1 by the housing 200 with being in an accessible state from the outside of the housing 200, a first base end 352a oppositely arranged to the first operational end 351a with the first hydraulic pump main body 300a in-between so that the first base end 352a is located coaxially with the first operational axis X1, and a first swash plate 353a which extends between the first operational end 351a and the first base end 352a so as to bring into contact with the first piston unit 330a to define a sliding range of the first piston unit 330a. The thus first trunnion movable swash plate 350a is so configured that the suction/discharge oil quantity of the first hydraulic pump main body 300a is varied by tiltably rotating the first swab plate 353a around the first operational axis X1 with the operational end 351a.

The second trunnion type movable swash plate 350b has substantially the same configuration as that of the first trunnion type movable swash plate 350a. Consequently, detailed description of the second trunnion type movable swash plate 350b will be properly omitted by replacing the end reference character "a" of the first trunnion type movable swash plate 350a with "b".

In the pump unit 100 of the present embodiment, the first and second trunnion type movable swash plates 350a, 350b are supported by the housing 200 in such a manner that each of operational ends 351a, 351b faces opposite to each other.

In particular, as shown in FIG. 5, the housing 200 includes a supporting wall 202 that is located between the first hydraulic pump main body 300a and the second hydraulic pump main body 300b within the pump accommodating chamber 200B.

The supporting wall 202 is configured to support each of base ends 352a, 352b of the first and the second trunnion type movable swash plates 350a, 350b in such a manner that the operational ends of the first and the second trunnion type movable swash plates 350a, 350b face to opposite directions to each other.

Specifically, the supporting wall 202 extends from the first end wall 241 along the axial direction of the first and the second pump shafts 310a, 310b between the first and the second hydraulic pump main bodies 300a, 300b.

At the surface that faces to the first hydraulic pump main body 300a of the supporting wall 202, a first bearing portion 203a that supports the base end 352a of the first trunnion movable swash plate 350a is provided, and at the surface that faces to the second hydraulic pump main body 300b of the supporting wall 202, a second bearing portion 203b that supports the base end 352b of the first trunnion movable swash plate 350b is provided.

Incidentally, at the first peripheral wall 242, a first and a second through holes 204a, 204b are formed so as to face to the first and the second bearing portions 203a, 203b, respectively.

The first and the second through holes 204a, 204b, respectively, serve as insertion holes to insert the base ends 352a, 352b and swash plates 353a, 353b of the first and the second trunnion type movable swash plates 350a, 350b into the pump accommodation chamber 200B.

And each of operational ends 351a, 351b of the first and the second trunnion type movable swash plates 350a, 350b are respectively supported via cap members 205, mounted into the first and the second through holes 204a, 204b, so as to face opposite to each other in the state accessible from the outside That is, the first trunnion type movable swash plate 350a is supported oscillably around the first operational axis X1 by the first bearing portion 203a provided at the supporting wall 202 and the cap member 205 mounted to the first through hole 204a of the first peripheral wall 242 so that the operational end 351a extends to one side in the vehicle width direction.

On the other hand, the second trunnion type swash plate 350b is supported oscillably around the second operational axis X2 by the second bearing portion 203b provided at the supporting wall 202 and the cap member 205 mounted into the second through hole 204b of the first peripheral wall 242 so that the operational end 351b extends to the other side in the vehicle width direction.

Furthermore, in the present embodiment, as shown in FIGS. 5 and 7, one side of the pump accommodating chamber 200B with the supporting wall 202 used as a reference (the side in which one of the first and the second hydraulic pump main bodies 300a, 300b is accommodated and hereinafter called a first pump space 200B(1)) and the other side of the pump accommodating chamber 200B with the supporting wall 202 used as a reference (the side in which the other of the first and a second hydraulic pump main bodies 300a, 300b is accommodated and hereinafter called the second pump space 200B(2)) are configured to be fluidly communicated to each other.

In the present embodiment, the supporting wall 202 has a groove at its free end. The groove is so configured to be opened outwards to form a communicating passage 292 that is located between the supporting wall 202 and the plate member 360 and that fluidly communicates between the first pump space 200B(1) and the second pump space 200B(2).

Preferably, the supporting wall 202 may be so configured that at least part of its free end brings into contact with the plate member 360, as shown in FIG. 7.

By configuring to bring at least part of the free end of the supporting wall 202 into contact with the plate member 360, the plate member 360 is able to be stably connected to the housing main body 230, thereby effectively preventing or reducing a leakage of operating oil from the contact area between the plate member 360 and the first and the second hydraulic pump main bodies 300a, 300b.

In the present embodiment, the groove is formed at the free end of the supporting wall 202 so that the communicating passage 292 could be formed between the supporting wall 202 and the plate member 360, but needless to say, in place of or in addition to the groove, a through hole may be provided in the supporting wall 202.

In addition, a groove may be provided at the portion opposite to the supporting wall 202 in the plate member 360 so that oil could be freely communicated between the first pump space 200B(1) and the second pump space 202B(2) via the groove.

The pump unit 100 of the present embodiment is so configured that the inner space of the housing 200 could be stored oil as described above. The thus pump unit 100 is further equipped with the following configuration in order to efficiently circulate the oil introduced into the housing 200.

That is, the housing 200 includes an inlet port 291 that communicates the outside with the first pump space 200B(1) (see FIGS. 3 and 8), an oil passage 293 that communicate the second pump space 200B(2) with the gear accommodating chamber 200A (see FIG. 6), and a discharge port 294 that communicates the gear accommodating chamber 200A with the outside (see FIG. 3). The thus housing 200 is so configured that oil introduced through the inlet port 291 into the first pump space 200B(1) of the pump accommodating chamber 200B flows into the second pump space 200B(2) via the communicating passage 292, then flows into the gear accommodating chamber 200A via the oil passage 293, and finally is discharged to the outside via the discharge port 294.

In the present embodiment, the discharge port 294 is fluidly connected to an external tank 90 via an external conduit 880b (see FIGS. 1 and 2).

With this configuration, oil supplied via the inlet port 291 first cools the first hydraulic pump main body 300a in the first pump space 200B(1) and the second hydraulic pump main body 300b in the second pump space 200B(2), and then is discharged to the outside from the gear accommodating chamber 200A. The thus configuration can prevent stagnation or pooling at the same position of the oil stored inside the housing 200, thereby improving the cooling efficiency of the first and the second hydraulic pump main bodies 300a, 300b.

Furthermore, with this configuration, the oil flow from the gear accommodating chamber 200A into the pump accommodating changer 200B can be prevented.

Consequently, it is possible to effectively prevent impurities such as iron powder, etc. generated from the first and the second transmission gears 282a, 282b and the input gear 281, etc. from exerting detrimental effects on the first and the second hydraulic pump main bodies 300a, 300b.

Incidentally, in the working vehicle 100 in the present embodiment, to the inlet port 291 of the housing 200, return oil of operating oil for working machine that is discharged from an auxiliary pump unit 800 later discussed is supplied in a state cooled by an oil cooler 855 to achieve still more improved cooling efficiency of the first and the second hydraulic pump main bodies 300a, 300b.

Figure 10:
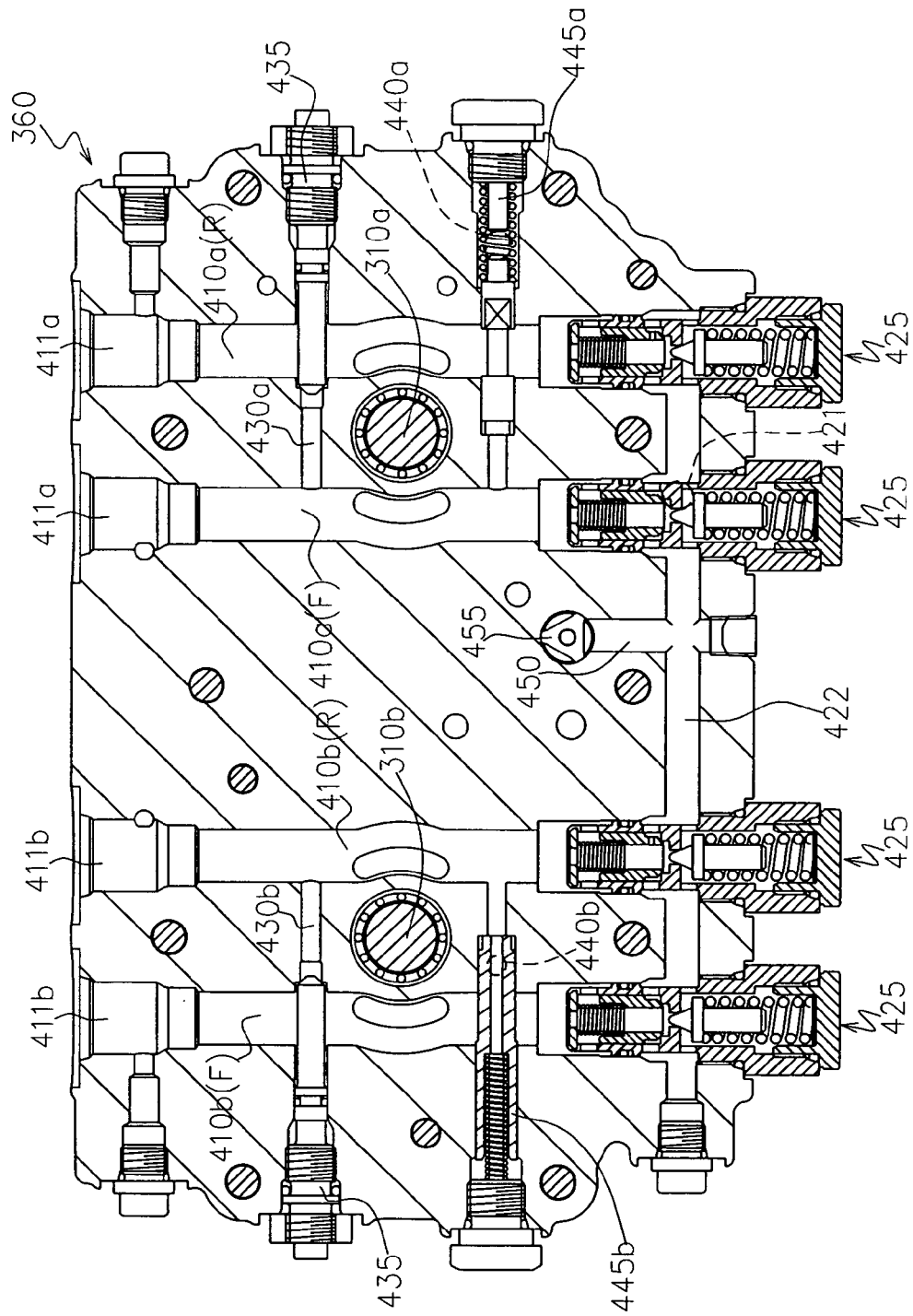
FIG. 10 is a longitudinal cross-sectional view of a plate member in the pump unit, taken along a line X-X in FIG. 3.

FIG. 10 is a longitudinal cross-sectional view of the plate member 360 taken along a line X-X in FIG. 3.

As shown in FIGS. 2 and 10, the plate member 360 includes a pair of first operating oil passages 410a which form part of the pair of first operating oil lines 400a, a first bypass passage 430a which communicates between the pair of first operating oil passages 410a and into which a bypass valve 435 for connecting/disconnecting the first bypass passage 430a is inserted, a pair of second operating oil passages 410b which form part of the pair of second operating oil line 400b, a second bypass passage 430b which communicates between the pair of first operating oil passages 410b and into which a bypass valve 435 for connecting/disconnecting the second bypass passage 430b is inserted.

Furthermore, the plate member 360 includes a common charge passage 421 which has a first end opened to the outside surface so as to form a charge port 420P, and a branched charge passage 422 which communicates with the common charge passage 421 and extends so as to cross over the pair of first operating passages 410a and the pair of second operating oil passages 410b.

Incidentally, at portions which communicate the pair of first operating oil passage 410a and the pair of second operating oil passages 410b with the branch charge passage 422, check valves 425 are interposed, respectively.

The check valve 425 is provided to allow pressurized oil to flow from the branched charge passage 422 into the pair of first operating oil passage 410a and the pair of second operating oil passage 410b, respectively, and to prevent the backflow.

Incidentally, in the present embodiment, the check valve 425 has a relief valve function (see FIG. 2) that operates when abnormally high pressure occurs inside the corresponding operating oil passages 410a, 401b.

As shown in FIG. 10, the pair of first operating oil passages 410a are formed substantially in parallel to each other with the corresponding first pump shaft 310a in-between.

In particular, the pair of first operating oil passages 410a, respectively, have first ends opened to the outside surface (top surface in the present embodiment) on one side of the plate member 360 to form a pair of first operating oil ports 411a, and second ends opened to the outside surface (bottom surface in the present embodiment) on the other side of the plate member 360, and center portions which form kidney ports fluidly connected to the first hydraulic pump main body 300a.

The second ends of the pair of first operating oil passages 410a are sealed via the check valves 425.

Similarly, the pair of second operating oil passages 410b are formed substantially in parallel to each other with the corresponding second pump shaft 310b in-between.

In particular, the pair of second operating oil passages 410b, respectively, have first ends opened to the outside surface (top surface in the present embodiment) on one side of the plate member 360b to form a pair of second operating oil ports 411b, second ends opened to the outside surface (bottom surface in the present embodiment) on the other side of the plate member 360, and center portions which form kidney ports fluidly connected to the second hydraulic pump main body 300b.

The second ends of the pair of second operating oil passages 410b are sealed via the check valves 425.

Furthermore, the plate member 360 includes, as shown in FIGS. 2 and 10, a first flushing passage 440a which communicates a first rearward-movement high-pressure-side operating oil passage 410a(R) at which a pressure becomes low during the forward travel of the working vehicle, out of the pair of first operating oil passages 410a, with an oil sump (the inner space of the housing 200 in this embodiment), the first flushing passage 440a having a first flushing valve 445a interposed therein, and a second flushing passage 440b which communicates a second rearward-movement high-pressure-side operating oil passage 410b(R) at which a pressure becomes low during the forward travel of the working vehicle, out of the pair of second operating oil passages 410b, with the oil sump, the second flushing passage 440b having a second flushing valve 445b interposed therein.

The first and the second flushing valves 445a, 445b are so configured to operate in a state that oil pressure of a forward-movement high-pressure-side operating oil passages 410a(F), 410b(F) at which pressure become high during the forward travel of the working vehicle, out of the pair of first operating oil passage 410a and the pair of second operating oil passage 410b, are used as pilot pressure, respectively. Specifically, when the oil pressure of the forward-movement high-pressure-side operating oil passages 410a(F), 410b(F) exceed a predetermined pressure, the first and second flushing valves 445a, 445b flow the operating oil from the rearward-movement high-pressure-side operating oil passages 410a(R), 410b(R) into the oil sump through an orifice.

With such a configuration, flushing action which promotes replenishment of operating oil from the common charge passage 421 and the branched charge passage 422 to each of the low-pressure-side operating oil passages out of the pair of first operating oil passages 410a and the pair of second operating oil passages 410b performs, thereby effectively preventing temperature rise of the operating oil in the pair of first operating oil line 400a and the pair of second operating oil line 400b.

Incidentally, in the present embodiment, as described above, the first transmission gear 282a and the second transmission gear 282b directly engage with the input gear 281, respectively, and the first and the second pump shafts 310a, 310b rotate in the same direction (counterclockwise in FIG. 9) as viewed along the axial direction.

Furthermore, as described above, the first and second trunnion type movable swash plate 350a, 350b are supported by the housing 200 in such a manner that the first operational end 351a is directed to one side in the vehicle width direction and the second operational end 351b is directed to the other side in the vehicle width direction (see FIG. 5).

By the way, the first and the second trunnion type movable swash plates 350a, 350b are coupled and linked to a first and a second operating levers 80a, 80b equipped in the vicinity of driver's seat via link mechanisms 85, respectively (see FIG. 1). In the thus configuration, if the operating directions of the first and the second operating levers 80a, 80b are brought to coincide to each other (that is, the operating direction of the first operating lever 80a in order to rotate the first hydraulic motor unit 10 in the vehicle forward travel direction is same as the operating direction of the second operation lever 80b in order to rotate the second hydraulic motor unit 20 in the vehicle forward travel direction) in a sate that the link mechanism 85 between the first trunnion type movable swash plate 350a and the first operating lever 80a is designed to have the substantially same configuration as that of the link mechanism 85 between the second trunnion type movable swash plate 350b and the second operating lever 80b, out of the pair of first operating oil passages 410a and the pair of second operating oil passages 410b, the passages located on the same side (left side in FIG. 10) on the basis of the corresponding pump shafts 310a, 310b as viewed along the axial direction become the forward-movement high-pressure-side operating oil passages 410a(F), 410b(F).

That is, with the plate member 360 as a reference, out of the pair of first operating oil passages 410a, the passage located which is inside becomes the first forward-movement high-pressure-side operating oil passage 410a(F) and the passage which is located outside becomes the first rearward-movement high-pressure-side operating oil passage 410a (R). On the other hand, out of the pair of second operating oil passages 410b, the passage which is located inside becomes the second rearward-movement high-pressure-side operating oil passage 410b(R) and the passage which is located outside becomes the second forward-movement high-pressure-side operating oil passage 410b(F).

In order to obtain the flushing action in the present embodiment with such a configuration, the first flushing valve 445a is of a direct acting type and the second flushing valve 445b is of a differential type.

Furthermore, the plate member 360 includes, as shown in FIGS. 2 and 10, a self-suction passage 450 and a check valve 455.

The self-suction passage 450 is so configured to, in case that either one of the pair of first operating lines 400a or either one of the pair of operating lines 400b becomes negative pressure when a charge pump main body 510 later discussed is stopped, automatically replenish the operating line having the negative pressure by sucking oil from the oil sump (inside space of the housing 200 in this embodiment) and supplying the same to the negative operating line. The check valve 455 is so configured to allow the oil to flow from the oil sump into the operating line having negative pressure out of the pair of first operating oil lines 400a or the operating line having negative pressure out of the pair of second operating oil lines 400b while preventing backflow of the oil.

That is, for example, when the working vehicle is parked on a sloping road and the engine 40 is stopped with HST being at the neutral state, rotating force is applied to the motor shafts operatively connected to the driving wheels 50, thereby the hydraulic motor units 10, 20 attempting to carry out pumping action.

In such event, if the pair of first operating oil lines 400a and the pair of second operating oil line 400b are filled with operating oil, braking force is acted on the hydraulic motor units 10, 20 through the operating oil. However, at the same time, by the above-mentioned pumping action of the hydraulic motor units 10, 20, one of the pair of first operating oil lines 400a and one of the pair of the second operating oil lines 400b are raised to high pressure, thus causing a fear of leakage of the operating oil from the high-pressure-side operating oil lines.

In the event that this kind of operating oil leakage occurs, oil circulation from the negative-pressure-side operating oil line to the high-pressure-side operating oil line occurs, thus promoting the operating oil leakage from the high-pressure side operating oil line. And finally, the operating oil in the pair of first operating oil line 400a and the pair of second operating oil line 400b is exhausted, which causes the driving wheels 50 to freely rotate, and then causes the vehicle to start descending the sloping road (free wheel phenomenon).

With respect to this point, in the pump unit 100 of the present embodiment, when either one of the pair of first operating oil lines 400a or either one of the pair of second oil lines 400b becomes negative pressure, the self-suction passage 450 automatically sucks the oil from the oil sump (the inside space of the housing 200 in the illustrated embodiment) and replenishes the operating oil line whose pressure is made negative with the sucked oil.

Consequently, the pump unit 100 could effectively prevent causing the free wheel phenomenon.

Furthermore, the pump unit 100 of the present embodiment, as shown in FIG. 2, is equipped with a charge pump unit 500 driven by one of the first and the second pump shafts 310a, 310b (in the present embodiment, second pump shaft 310b) in addition to the above-mentioned configuration.

In particular, the charge pump unit 500 includes a charge pump main body 510 driven by the second pump shaft 310b, and a charge pump case 520 connected to the plate member 360 in such a manner as to surround the charge pump main body 510.

As shown in FIGS. 5 and 6, in the present embodiment, the second pump shaft 310b has a downstream end in the transmission direction, opposite to a upstream end in the transmission direction that supports the second transmission gear 282b, to pass through the plate member 360 and extends toward the outside.

And the charge pump main body 510 is driven by the outer extended portion of the second pump shaft 310b.

The charge pump case 520 has a shape nearly equal to the size of the plate member 360 and is removably connected to the plate member 360 with one end face superimposed on the outer surface of the plate member 360 (surface opposite to the first housing member 240 in the plate member 360).

Incidentally, the other end face on the side opposite to the one end face of the charge pump case 520 is so configured that an area corresponding to the second pump shaft 310b forms a mount face for an auxiliary pump unit 800 later discussed (hereinafter called the auxiliary pump unit mount face 800a), and an area corresponding to the first pump shaft 310a forms a mount face for a line filter 530 later discussed (hereinafter called the line filter mount face 530a).

The charge pump case 520 forms the following passages including suction/discharge passages fluidly communicated to the charge pump main body 510 therein.

Figure 11:
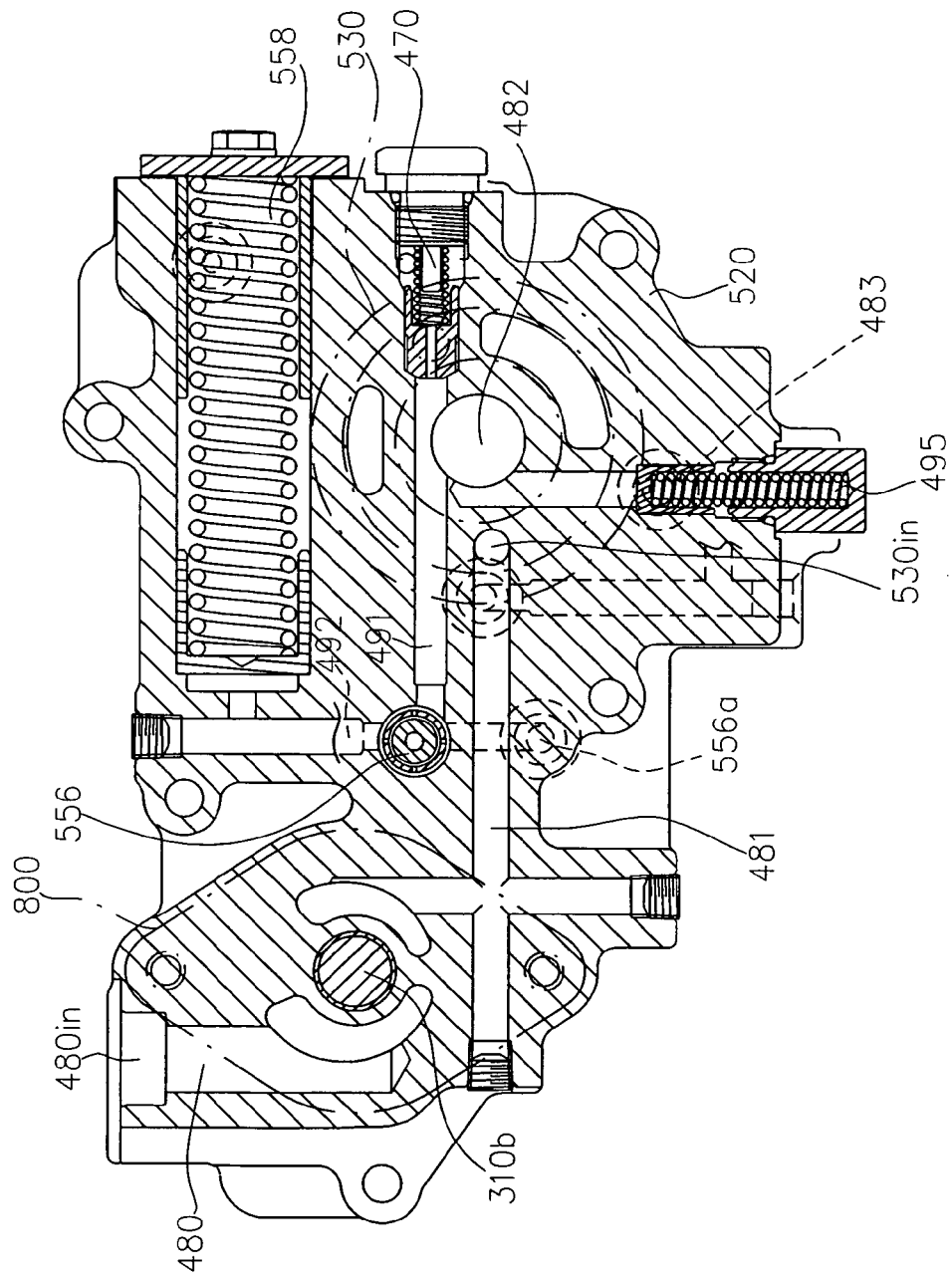
FIG. 11 is a cross-sectional view of a charge pump case in the pump unit, taken along a line XI-XI in FIG. 5.

FIG. 11 is a cross-sectional view of the charge pump case 520 taken along a line XI-XI in FIG. 5.

That is, as shown in FIGS. 2, 5, 7, 8, and 11, the charge pump case 520 includes a suction passage 480 which has a first end opened to the outer surface (top surface in the present embodiment) to form a suction port 480 in and a second end communicated with the suction port of the auxiliary pump main body 510; an unfiltered discharge passage 481 which has a first end communicated with the discharge port of the auxiliary pump main body 510 and a second end opened to the line filter mount face 530a so as to be communicated with the inlet port 530 in of the line filter 530; a filtered discharge passage 482 which has a first end opened to the line filter mount face 530a so as to be communicated with the outlet port 530 out of the line filter 530; a resistance valve 489 whose primary side is communicated with the filtered discharge passage 482; a charge discharge passage 483 which has a first end communicated with the secondary side of the resistance valve 489 and a second end opened to the contact surface with the plate member 360 so as to be communicated with the charge port 420P; a charge relief valve 540 interposed in the charge discharge passage 483; a first PTO passage 491 which has a first end communicated with the filtered discharge passage 482; a PTO solenoid valve 556 whose primary side is communicated with the first PTO passage 491; a second PTO passage 492 which has a first end communicated with the secondary side of the PTO solenoid valve 556 and a second end opened to the contact surface with the plate member 360; a first PTO drain passage 556a which has a first end communicated with a drain port of the PTO solenoid valve 556 and a second end communicated with the internal space of the housing 200 via a passage formed in the plate member 360; and an accumulator 558 interposed in the second PTO passage 492.

The suction port 480 in is fluidly connected to an external tank 90 having a strainer 486 incorporated, via an external conduit 485 (see FIGS. 1 and 2).

The charge discharge passage 483 forms a charge line to replenish the operating oil from the charge pump main body 510 to the pair of first operating oil passages 410a and the pair of second operating oil passages 410b, together with the common charge passage 421 and the branched charge passage 422 both which are provided in the plate member 360.

The first and the second PTO passages 491, 492 form a part of the PTO line 490 (see FIG. 2) that feeds the operating oil from the charge pump main body 510 to the PTO clutch mechanism 600A.

That is, in the present embodiment, as shown in FIGS. 6, 7, and 9, the PTO line 490 includes: in addition to the first and the second PTO passages 491, 492, a third PTO passage 493 formed in the plate member 360; a forth PTO passage 494 formed in the first housing member 240; an inner conduit 499 that extends between the first end wall 241 of the first housing member 240 and the second end wall 251 of the second housing member 250; a fifth PTO passage 495 formed in the second housing member 250; a rotary joint 498 provided at the contact portion between the second end wall 251 and the PTO shaft 610; and a PTO axial hole 615 drilled in the PTO shaft 610.

The third PTO passage 493, as shown in FIG. 7, has a first end opened to the contact surface with the charge pump case 520 so as to be communicated with a second end of the second PTO passage 492, and a second end opened to the contact surface with the first housing member 240.

The forth PTO passage 494, as shown in FIG. 7, has a first end opened to the contact surface with the plate member 360 so as to be communicated with the second end of the third PTO passage 493, and a second end opened into the gear accommodating chamber 200A.

The fifth PTO passage 495, as shown in FIGS. 6, 7, and 9, has a first end opened into the gear accommodating chamber 200A, and a second end opened to an inner circumferential surface of a bearing hole which supports the PTO shaft 610.

The internal conduit 499, as shown in FIG. 7, is disposed in the gear accommodating chamber 200A so as to communicate between the second end of the fourth PTO passage 494 communicates and the first end of the fifth PTO passage 495.

Incidentally, needless to say, it is possible to eliminate the internal conduit 499 by employing a construction in which the second end of the fourth PTO passage is opened to the contact surface with the second housing member 250 and the first end of the fifth PTO passage 495 is opened to the contact surface with the first housing member 240.

The PTO axial hole 615, as shown in FIG. 6, has a first end communicated with the fifth PTO passage 495 via the rotary joint 498, and a second end opened toward the push-to-move member 650 of the PTO clutch mechanism 600A.

In the PTO line 490, as shown in FIG. 2, the PTO solenoid valve 556, the accumulator 558 disposed at downstream side of the PTO solenoid valve 556, and the PTO relief valve 557 disposed at downstream side of the PTO solenoid valve 556 are interposed.

The accumulator 558, as shown in FIG. 11, is provided in the charge pump case 520 in such a manner as to be interposed into the second PTO passage 492.

More particularly, in the present embodiment, the accumulator 558 is mounted in a region other than the region corresponding to the auxiliary pump unit 800 and the line filter 530, out of the charge pump case 520.

The PTO solenoid valve 556 is provided in the charge pump case 520 in such a manner as to be located between the first PTO passage 491 and the second PTO passage 492 as described above (see FIGS. 7 and 11).

The PTO relief valve 557 is provided in the second end wall 251, as shown in FIG. 9, in such a manner as to be interposed into the fifth PTO passage 495.

In the pump unit 100, the charge pump case 520, as shown in FIGS. 2 and 11, is equipped with a filter bypass valve 470 which bypasses between the unfiltered discharge passage 481 and the filtered discharge passage 482 in an event that the line filter 530 is clogged.

With the filter bypass valve 470, it is possible to prevent oil from running out at downstream side of the line filter 530 even if the line filter 530 is clogged.

In the present embodiment, the pump unit 100, as shown in FIGS. 1 and 2, further includes in addition to the above-mentioned configuration, an auxiliary pump unit 800 which is operatively driven by either one of the first and the second pump shafts 310a, 310b (second pump shaft 310b in the present embodiment).

The auxiliary pump unit 800 is provided to supply operating oil to the working machine, etc. equipped to the working vehicle.

In the present embodiment, as shown in FIGS. 1 and 2, the auxiliary pump unit 800 is intended to supply the operating oil to a double-acting hydraulic cylinder 75 which is used to elevate the working machine 70 (for example, the mower machine).

And after the return oil from the working machine is cooled by an oil cooler 855, the return oil is introduced into the first pump space 200B(1) of the pump accommodating chamber 200B through the inlet port 291 of the housing 200.

The auxiliary pump unit 800 includes an auxiliary pump main body 810 (see FIG. 2) and an auxiliary pump case 820.

The auxiliary pump main body 10 could take various forms, but in the present embodiment, is a high-pressure pump of an external engaging gear-type.

In particular, the auxiliary pump main body 810, as shown in FIG. 6, includes an auxiliary pump driving shaft 811 operatively connected to the second pump shaft 310b, an auxiliary pump driven shaft (not shown) disposed substantially in parallel to the auxiliary pump driving shaft 811, and a pair of pump gears 813 respectively supported by the auxiliary pump driving shaft 811 and the auxiliary pump driven shaft in such a manner to engage with each other.

The auxiliary pump case 820 is removably coupled to the auxiliary pump unit mount surface 800a, and is configured to surround the pair of pump gears 813 while supporting the auxiliary pump driving shaft 811 and the auxiliary pump driven shaft.

As shown in FIG. 6, the auxiliary pump case 820 includes a suction passage which has a first end opened to the outer surface to form a suction port 821 and a second end communicated with one side of the engaging point of the pair of pump gears 813, and a discharge passage which has a first end communicated with the other side of engaging point of the pair of pump gears 813 and a second end opened to the outside surface to form a discharge port 822.

In the present embodiment, as shown in FIGS. 1 and 2, the suction port 821 is fluidly connected to the external tank 90 via the external conduit 830.

The discharge port 822 is fluidly connected to a valve unit 850, which has a relief valve 851 for a working machine and a switching valve 852, via an external conduit 840.

And the return oil from the valve unit 850 is introduced through the inlet port 291 into the housing 200 via an external conduit 880a with the oil cooler 855 interposed, and by this, the first and the second hydraulic pump main bodies 300a, 300b accommodated in the housing 200 are positively cooled.

Incidentally, reference numeral 860 in FIG. 2 denotes conduits which fluidly communicate the valve unit 850 with the double-acting type hydraulic cylinder 75 in the working machine 70.

In the present embodiment, the pump unit 100 further includes a pair of neutral return springs 750 which bias the first and the second trunnion type movable swash plates 350a, 350b to the neutral position, respectively.

Figure 12:
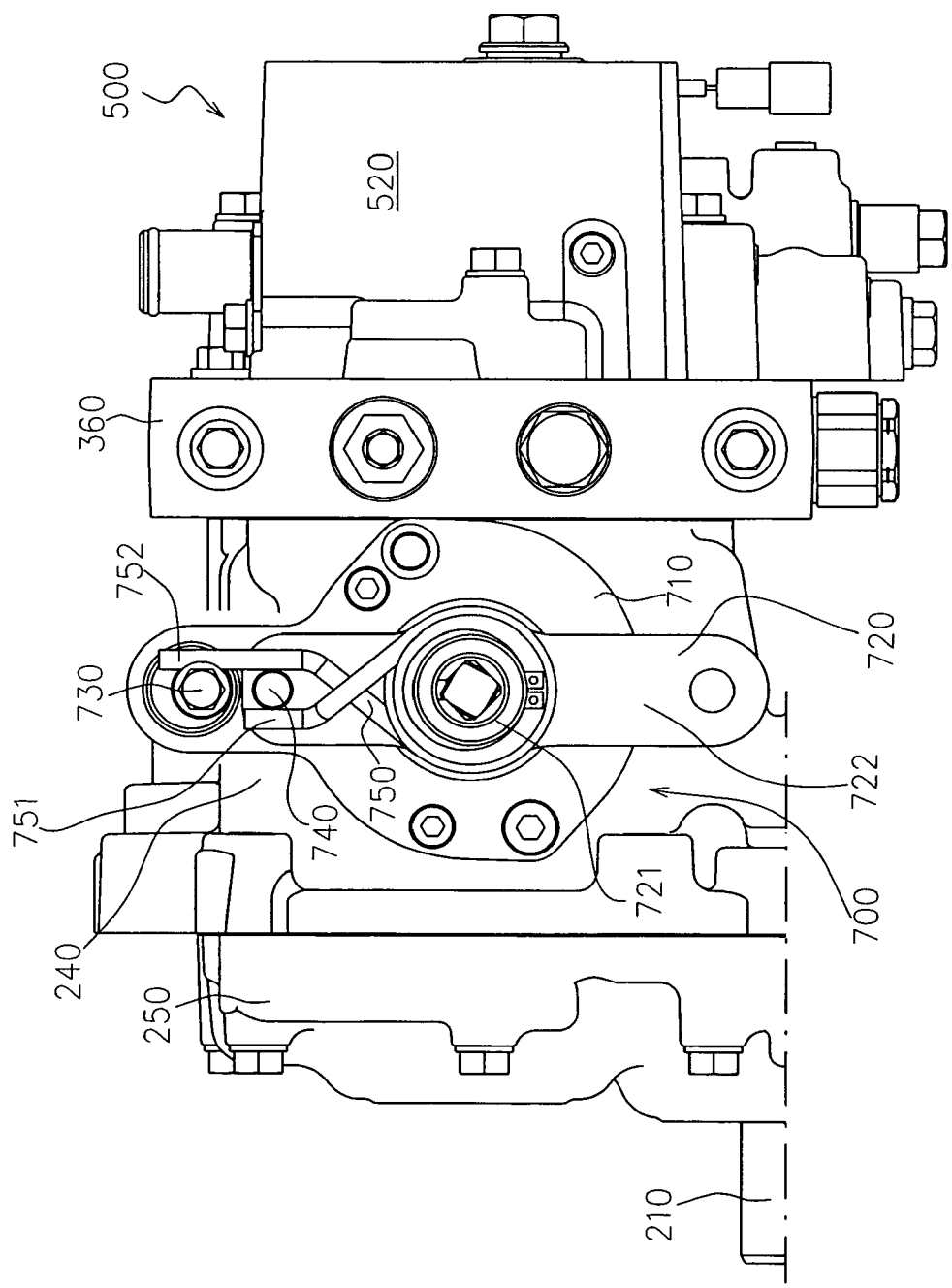
FIG. 12 is a side view of the pump unit, taken along a line XII-XII in FIG. 4.

FIG. 12 is a side view of the pump unit 100 taken along a line XII-XII in FIG. 4.

The neutral return spring 750 is disposed between a control arm 720, which is coupled in a relatively non-rotatable manner to the operational end 351 of the corresponding trunnion type movable swash plate 350, and the housing 200, and is configured to return the control arm 720 to the neutral position.

In the present embodiment, the neutral return spring 750 is equipped to the pump unit 100 as one constituent element of a neutral position return unit 700.

That is, as shown in FIG. 4, the pump unit 100 includes a pair of neutral position return units 700 which work on the first and the second trunnion type movable swash plates 350a, 350b, respectively.

The neutral position return unit 700, as shown in FIGS. 4, 5, and 12 includes a base plate 710 coupled to the housing 200 via the cap member 205, the control arm 720, a fixed pin 730 directly or indirectly provided at the housing 200, a movable pin 740 provided at the control arm 720, and the neutral return spring 750.

The control arm 720 has a shaft portion 721 which is located coaxially with the operational axis of the corresponding trunnion type movable swash plate 350 and which is coupled in a relatively non-rotatable manner about the axis to the operational end 351 of the trunnion type movable swash plate 350, and an arm portion 722 which extends from the shaft portion 721 in the direction orthogonal to the shaft portion 721.

The movable pin 740 is provided on one end of the arm 722 as shown in FIG. 12.

Incidentally, to the other end of the arm 722, the link mechanism 85 which is connected with the corresponding operation lever 80 is coupled.

The fixed pin 730 is provided at the base plate 710.

Preferably, the fixed pin 730 may have an eccentric construction in which a base end coupled to the base plate 710 and a tip end extending from the base end are eccentric.

The neutral return spring 750 is a helix spring which has a center section wrapped around the shaft portion 721, and a first end 751 and a second 752 which are extended from the center section to radially outwards.

In particular, the neutral return spring 750 is wrapped around the shaft portion 721 in such a manner that the movable pin 740 and fixed pin 730 are located between the first end 751 and the second end 752.

And when the operational end 351 of the trunnion type movable swash plate 350 is rotated around the operational axis in accordance with the external operation, the movable pin 740 pushes and moves one of the first end 751 or the second end 752 with the fixed pin 730 holding the other of the first end 751 or the second end 752 at the initial position, thereby the retained elasticity of the neutral return spring 750 being increased.

That is, when an external operation force is applied so that the operational end 351 of the trunnion type movable swash plate 350 rotates around the operational axis, the retained elasticity of the center section of the neutral return spring 750 is increased in accordance with the rotating volume of the operational end 351, and when the external operation force is released, the retained elasticity of the neutral return spring 750 returns the movable pin 740 to the initial position.

Preferably, the neutral return spring 750 is configured to bias the trunnion type movable swash plate 350 towards the neutral position only when the corresponding trunnion type movable swash plate 350 is operated to a direction for traveling the vehicle rearward.

Specifically, as shown in FIG. 12, the fixed pin 730 may be located radially outwardly than the movable pin 740 with the operational axis of the corresponding trunnion type movable swash plate 350 being as a reference, and an end which pushes and moves the movable pin 740 (first end 751 in FIG. 12) during operation for traveling the vehicle forward, out of the first and the second ends 751, 752, could be configured not to engage with the fixed pin 730.

By equipping the configuration, fine adjustment operation of the operation lever 80 during the operation for traveling the vehicle forward could be easily performed.

That is, during traveling the vehicle, scenes or times to forward-travel the vehicle are overwhelmingly frequent than to reverse. During vehicle forward-travel operation, when the vehicle goes straight with both shift levers 80a, 80b tilted forward at nearly same angle, operations to frequently vary gradients of both shift levers 80a, 80b are required to subtly adjust the travel direction, or when the vehicle turns, operations to reduce the gradient (or to return to the neutral side) of the lever 80 on the side corresponding to the inside of the turning or to increase the gradient of the lever 80 on the side corresponding to the outside of the turning are required.

If the end that pushes and moves the movable pin 740 (first end 751 in FIG. 12) during vehicle forward-travel operation, out of the first and the second ends 751, 752, is engaged with the fixed pin 730, the retained elasticity of the neutral return spring 750 increases as the vehicle's speed increases, thereby increasing the operating force required to operate the operation lever 80. This results in causing the push-pull operation of the operation lever 80 to be heavy during vehicle forward travel, and poor maneuverability.

In view of this, the pump unit 100 of the present embodiment is so configured that, out of the first and the second ends 751, 752, the end that pushes and moves the movable pin 740 (first end 751 in FIG. 12) during vehicle forward-travel operation is not engaged with the fixed pin 730, thereby preventing variation of operating force to be required during vehicle forward-travel operation, alleviating fatigue of driver's arm and improving the maneuverability.

Incidentally, in the configuration, during vehicle rearward-travel operation, retained elasticity of the neutral return spring 750 increases as the speed increases. That is, during vehicle rearward-travel operation, force required to operate the trunnion type movable slash plate 350 increases as the vehicle's speed increases.

However, traveling the vehicle rearward is less frequent than traveling the vehicle forward, and furthermore, in traveling the vehicle rearward, it is more desirable from the viewpoint of safety to return the trunnion type movable slash plate 350 to the neutral position automatically and as quickly as possible than to keep traveling continuously under such condition, should the shift lever 80 be released.

Therefore, in the present embodiment, the above-mentioned configuration is adopted.

Second Embodiment

Referring now to the accompanying drawings, a second embodiment of a pump unit according to the present invention will be described in detail hereinafter.

Figure 13:
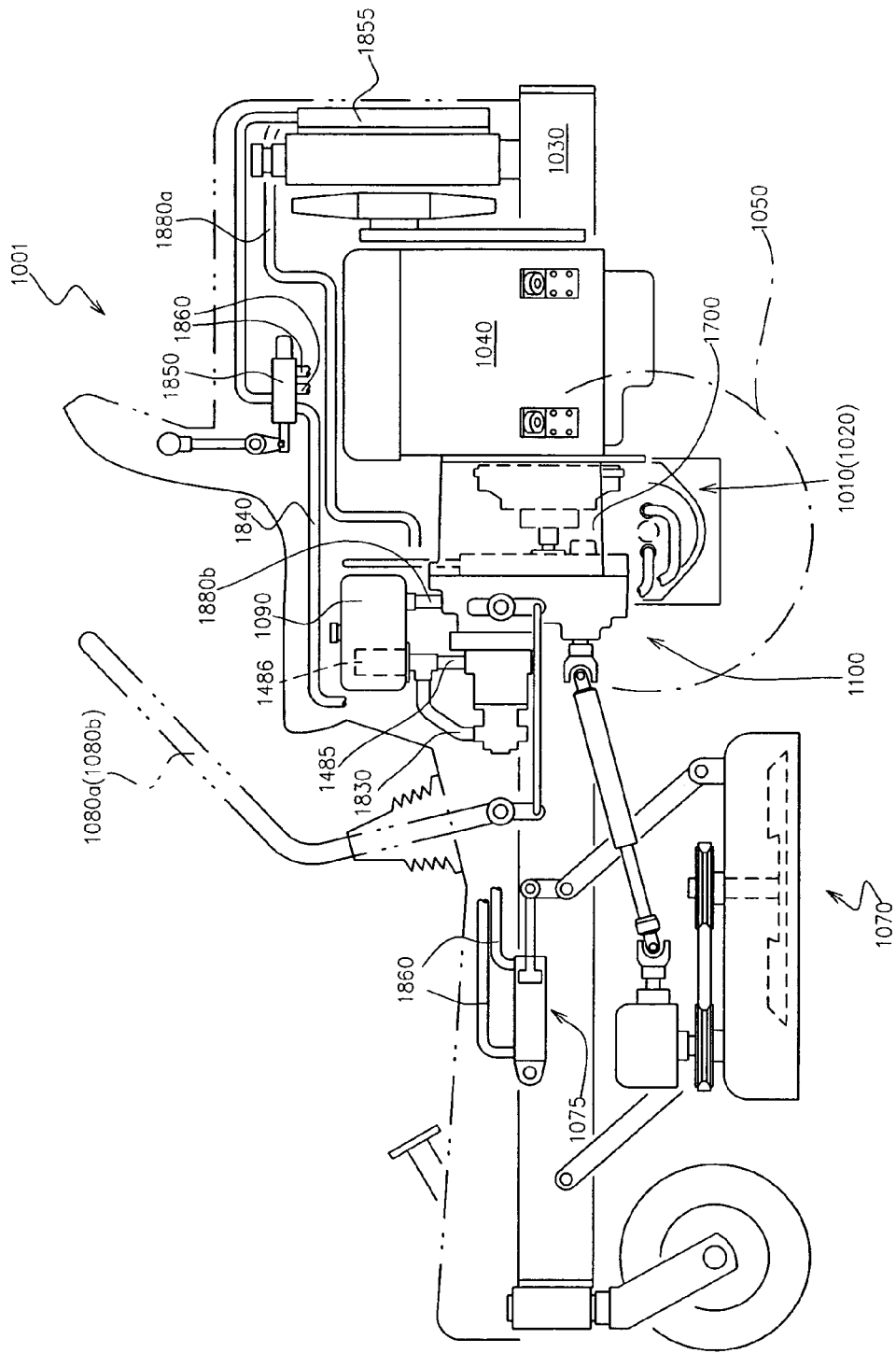
FIG. 13 is a schematic side view of a working vehicle to which a pump unit 1100 of a second embodiment according to the present invention is applied.
Figure 14:
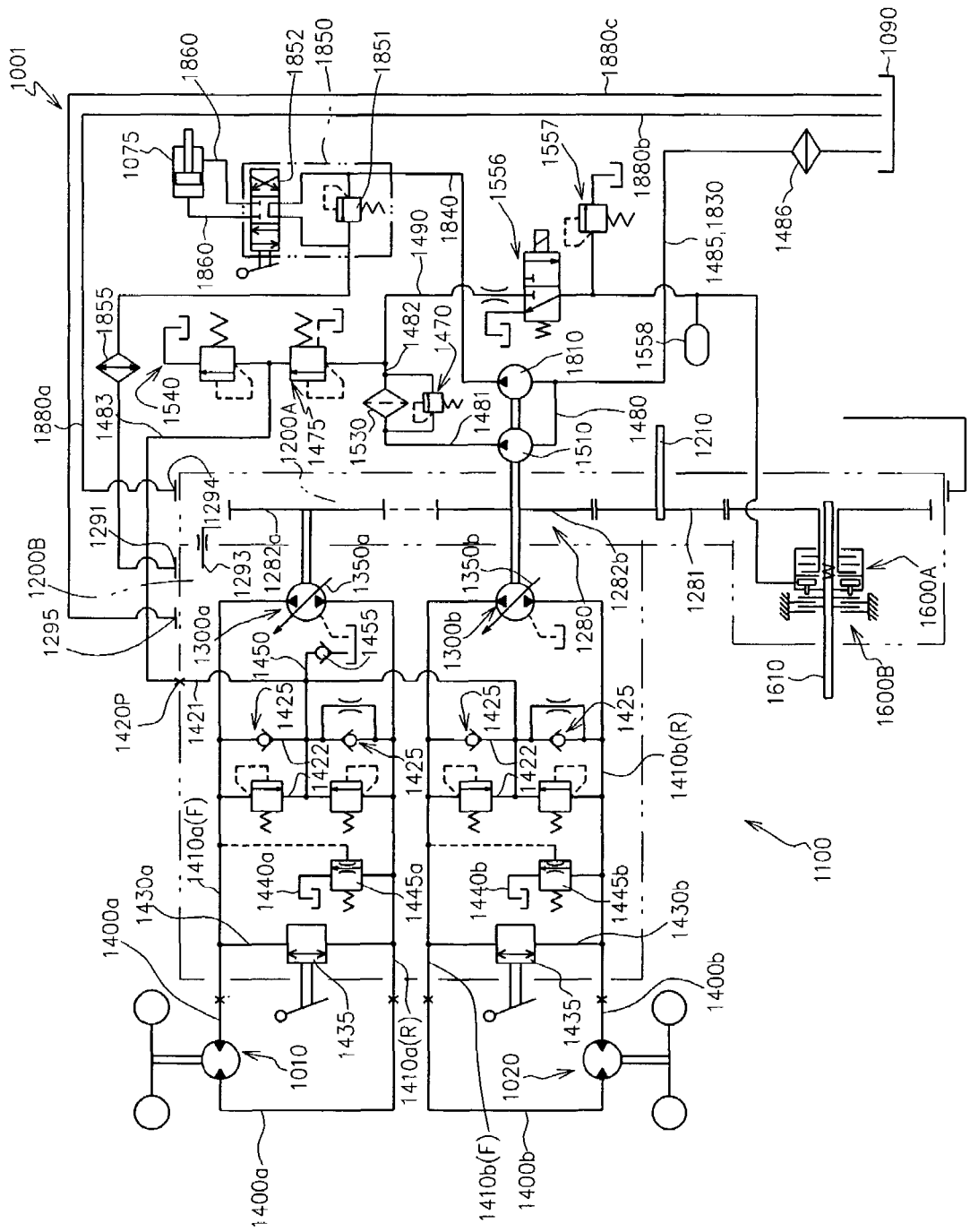
FIG. 14 is a hydraulic circuit diagram of the working vehicle of the second embodiment.

FIGS. 13 and 14 are a schematic side view and a hydraulic circuit diagram of a working vehicle 1001 to which a pump unit 1100 of the present embodiment is applied, respectively.

Figure 15:
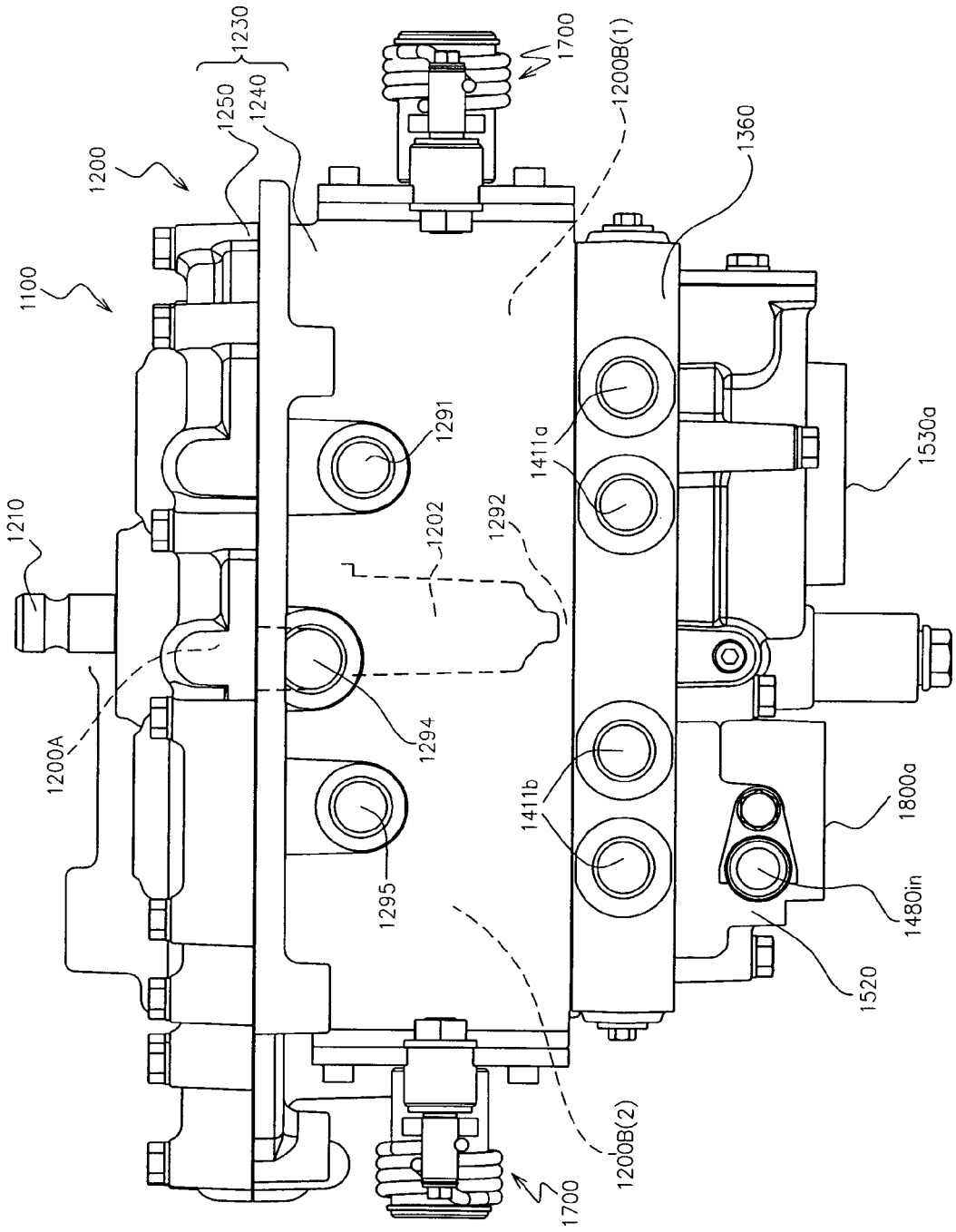
FIG. 15 is a plan view of the pump unit of the second embodiment.

In addition, FIG. 15 is a plan view of the pump unit 1100.

As shown in FIGS. 13 and 14, the working vehicle 1001 is equipped with a driving source 1040 mounted at the rear region of a vehicle frame 1030, the pump unit 1100 operatively connected to the driving source 1040, the pair of first and second hydraulic motor units 1010, 1020 fluidly connected to the pump unit 1100, and a pair of right and left driving wheels 1050 which are driven by the pair of first and second hydraulic motor units 1010, 1020.

That is, the pump unit 1100 of the present embodiment is so configured to form a traveling-system variable-speed transmission mechanism in cooperation with the pair of the first and the second hydraulic motor units 1010, 1020 equipped to the working vehicle 1001.

Specifically, as shown in FIG. 14, the pump unit 1100 includes a first hydraulic pump main body 1300a fluidly connected to the first hydraulic motor unit 1010 via a pair of first operating oil line 1400a, a second hydraulic pump main body 1300b fluidly connected to the second hydraulic motor unit 1020 via a pair of second operating oil line 1400b, and a first and a second output-adjusting members 1350a, 3150b which vary suction/discharge oil quantity of the first and the second hydraulic pump main bodies 1300a, 1300b, respectively. The pump unit 1100 is so configured that the first hydraulic pump main body 1300a and a hydraulic motor main body in the first hydraulic motor unit 1010 form a first HST, and the second hydraulic pump main body 1300b and a hydraulic motor main body in the second hydraulic motor unit 1020 form a second HST.

Incidentally, in the present embodiment, the first and the second hydraulic motor units 1010, 1020 are of a fixed displacement type (see FIG. 14), but they may be of a variable displacement type.

Figure 16:
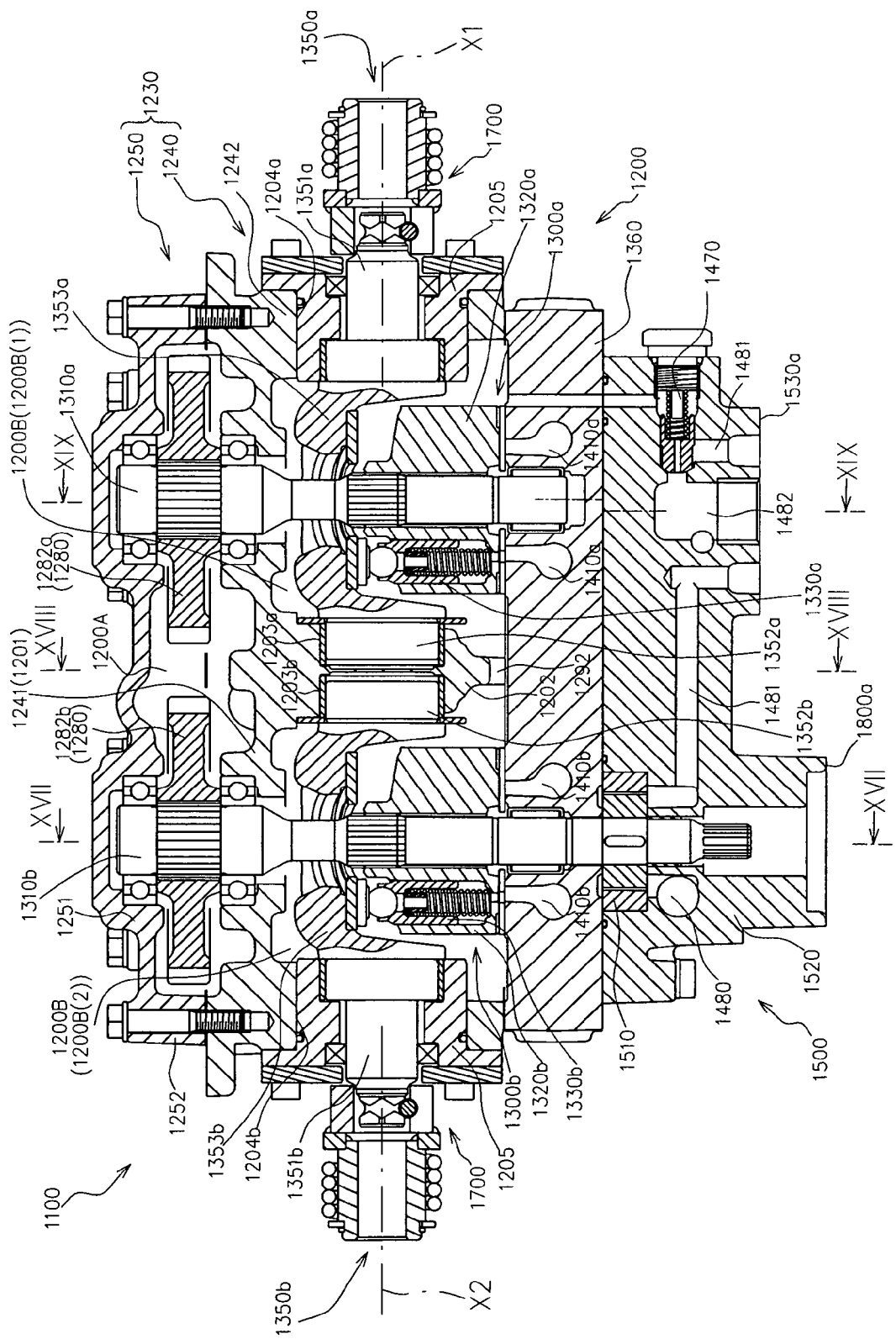
FIG. 16 is a transverse cross-sectional view of the pump unit of the second embodiment.

FIG. 16 is a transverse cross-sectional view f the pump unit 1100.

Figure 17:
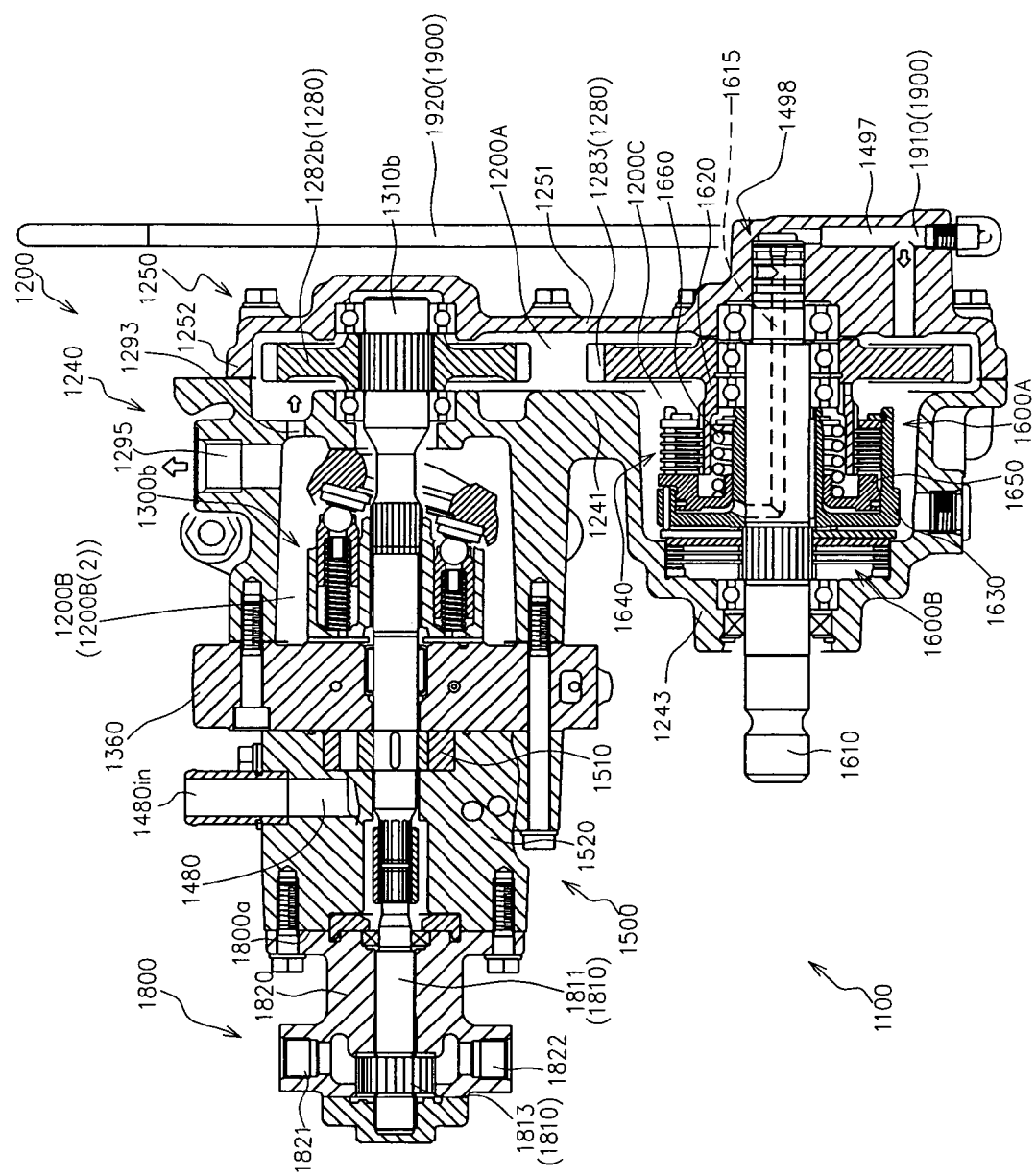
FIG. 17 is a cross-sectional view of the pump unit of the second embodiment, taken along a line XVII-XVII in FIG. 16.
Figure 18:
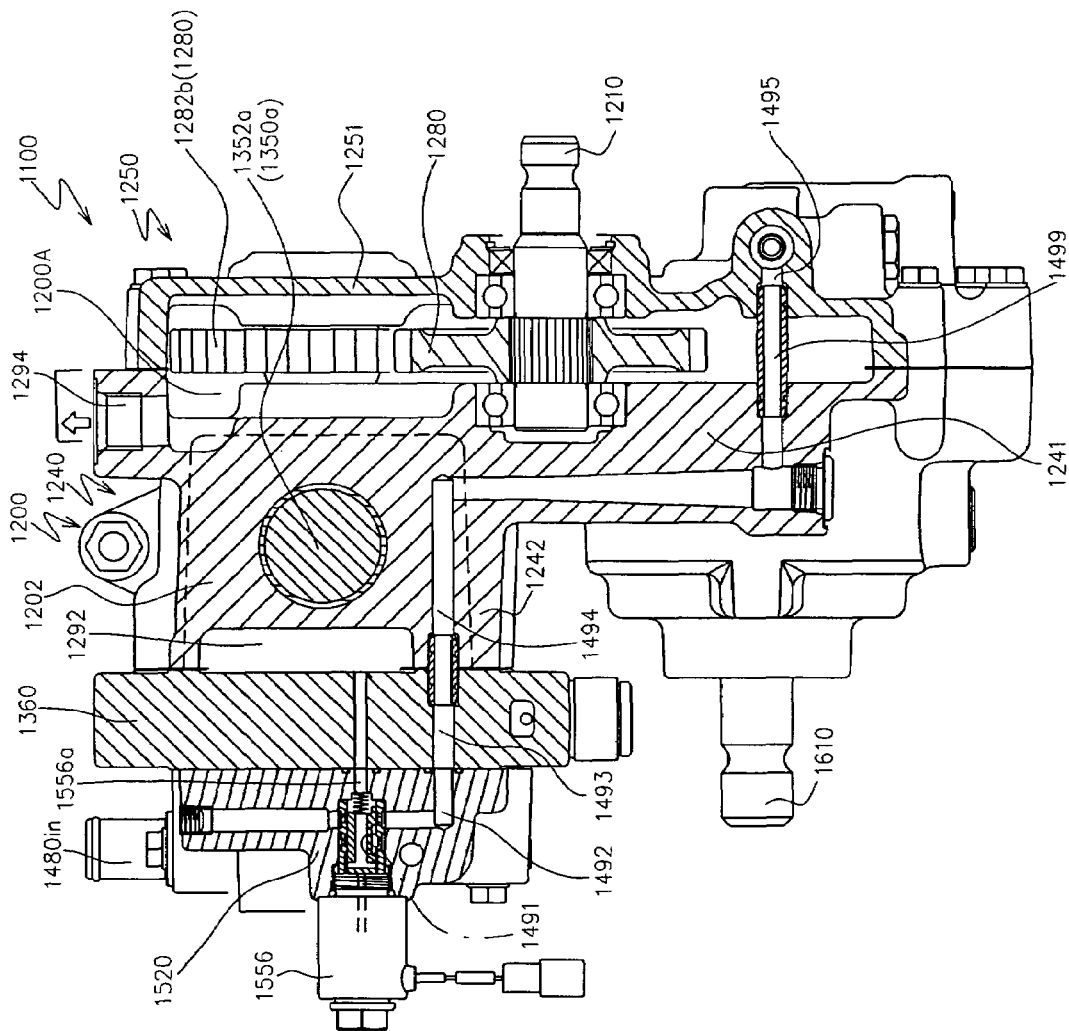
FIG. 18 is a cross-sectional view of the pump unit of the second embodiment, taken along a line XVIII-XVIII in FIG. 16.
Figure 19:
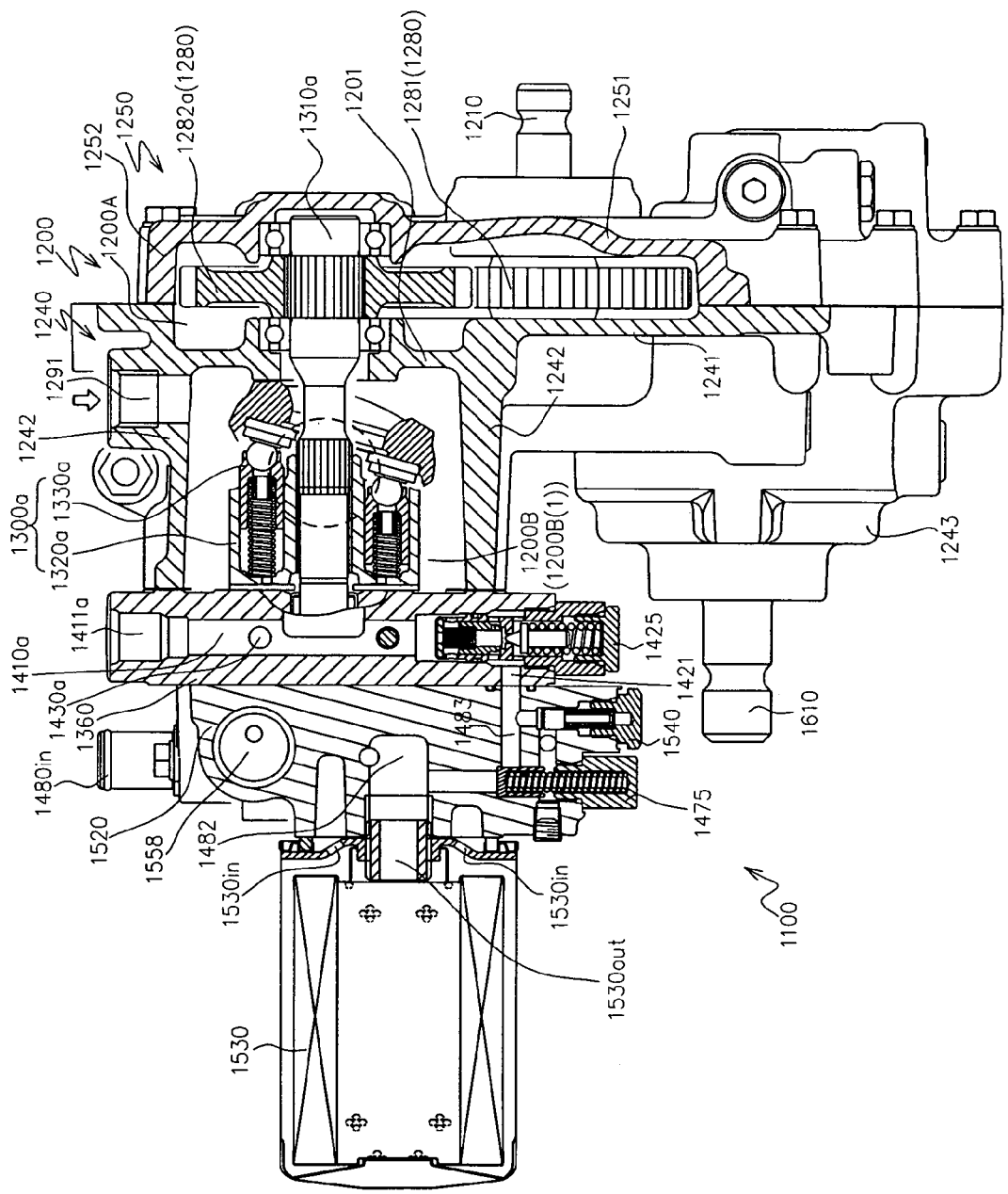
FIG. 19 is a cross-sectional view of the pump unit of the second embodiment, taken along a line XIX-XIX in FIG. 16.

FIGS. 17 to FIG. 19 are cross-sectional views of the pump unit 110 taken along lines XVII-XVII, XVIII-XVIII, and XIX-XIX in FIG. 16, respectively.

As shown in FIG. 16 through FIG. 19, the pump unit 1100 includes a housing 1200, a first and a second pump shafts 1310a, 1310b supported by the housing 200 in a rotatable manner about its respective axis, the first and the second hydraulic pump main bodies 1300a, 1300b rotatably driven by the first and the second pump shafts 1310a, 1310b, respectively, the first and a second output-adjusting members 1350a, 1350b, and a gear train 1280 that includes a first and a second transmission gears 1282a, 1282b supported on the first and the second pump shafts 1310a, 1310b in a relatively non-rotatable manner to rotate the first and the second pump shafts 1310a, 1310b in synchronism.

The housing 1200 is designed to be directly or indirectly supported by a supporting member such as the vehicle frame 1030, etc.

In the present embodiment, the housing 1200 is connected to the driving source 1040 via a connection case 1700 in a free state to the vehicle frame 1030 (see FIG. 13).

That is, as shown in FIG. 13, the driving source 1040 is oscillatably supported by the vehicle frame 1030 via rubber vibration isolator, and the housing 1200 is connected to the driving source 1040 via the connection case 1700 in a free state to the vehicle frame 1030 so that the housing 1200 can be oscillated integrally with the driving source 1040.

The housing 1200 has an inner space which is so configured to be able to store oil. The oil-storable inner space is divided into a pump accommodating chamber 1200B that accommodates the first and the second hydraulic pump main bodies 1300a, 1300b and a gear accommodating chamber 1200A that accommodates the gear train 1280 by a partition wall 1201.

In the present embodiment, the housing 1200 includes a housing main body 1230, and a plate member 1360 (center section) which is removably connected to the housing main body 1230 and which forms suction/discharge passages for the first and the second hydraulic pump main bodies 1300a, 1300b therein.

The housing main body 1230, as shown in FIGS. 16, 17, and 19, includes a first housing member 1240 that forms the pump accommodating chamber 1200B in cooperation with the plate member 1360, and a second housing member 1250 that is removably connected to the first housing member 1240 and that forms the gear accommodating chamber 1200A in cooperation with the first housing member 1240.

The first housing member 1240 includes a first end wall 1241 that extends along the direction orthogonal to the axial direction of the first and the second pump shafts 1310a, 1310b, and a first peripheral wall 1242 that extends from the first end wall 1241 along the axial direction of the first and the second pump shafts 1310a, 1310b. The first housing member 1240 is so configured to have an opening at a free end side, opposite to the first end wall 1241, of the first peripheral wall 1242.

The opening is the size that enables the insertion of the first and the second hydraulic pump main bodies 1300a, 1300b and is liquid-tightly closed by the plate member 1360.

That is, in the present embodiment, the pump accommodating chamber 1200B is formed by the first end wall 1241 and the first peripheral wall 1242 of the first housing member 1240 as well as the plate member 1360.

The second housing member 1250 includes a second end wall 1251 which is opposed to the first end wall 1241 with a space provided in the condition connected to the first housing member 1240.

That is, in the present embodiment, the space between the first end wall 1241 and the second end wall 1251 forms the gear accommodating chamber 1200A, and the first end wall 1241 works as the partition wall 1201 that divides the oil-storable inner space into the pump accommodating chamber 1200B and the gear accommodating chamber 1200A.

In the present embodiment, the second housing member 1250 includes a second peripheral wall 1252 that extends from the peripheral edge of the second end wall along the axial direction of the first and the second pump shafts 1310a, 1310b in addition to the second end wall 1251, and is so configured that a free end face of the second peripheral wall 1252 is connected to the first housing member 1240.

That is, in the present embodiment, the gear accommodating chamber 1200A is formed by the second end wall 1251 and the second peripheral wall 1252 of the second housing member 1250 as well as the first end wall 1241 of the first housing member 1240.

In the present embodiment, the pump unit 1100 includes, as shown in FIGS. 14 and 17, a PTO shaft 1610 which outputs driving power to the working machine 1070 (see FIG. 13) such as a mower device, etc. attached to the working vehicle 1001, and a PTO clutch mechanism 1600A interposed in a power transmission channel from the driving source 1040 to the PTO shaft 1610.

Specifically, as shown in FIG. 17, the first housing member 1240 is so configured that a part of the first end wall 1241 is bulged at a position where avoids the first peripheral wall 1242.

And the PTO shaft 1610 is supported by the bulged portion 1243 of the first end wall 1241 and the second end wall 1251 so that its downstream end in the transmission direction extends outwards from the first end wall 1241.

The PTO clutch mechanism 1600A is accommodated in a PTO chamber 1200C formed by the bulged portion 1243 of the first end wall 1241 and the second end wall 1251 in such a manner as to communicate with the gear accommodating chamber 1200A.

The first and the second pump shafts 1310a, 1310b are supported by the housing 1200 substantially in parallel to each other in a state to be synchronously rotated by the driving source 1040.

Specifically, as shown in FIG. 16, the first and the second pump shafts 1310a, 1310b are supported by the second end wall 1251 of the second housing member 1250 and the first end wall 1241 of the first housing member 1240 as well as the plate member 1360 in such a manner as to cross over the gear accommodating chamber 1200A and the pump accommodating chamber 1200B.

And as shown in FIGS. 16 and 19, out of the first pump shaft 1310a, at the portion that falls on the gear accommodating chamber 1200A, the first transmission gear 1282a is supported, and at the portion that falls on the pump accommodating chamber 1200B, the first hydraulic pump main body 1300a is supported.

Similarly, as shown in FIGS. 16 and 17, out of the second pump shaft 1310b, at the portion that falls on the gear accommodating chamber 1200A, the second transmission gear 1282b is supported, and at the portion that falls on the pump accommodating chamber 1200B, the second hydraulic pump main body 1300b is supported.

Incidentally, in the present embodiment, the pump unit 1100 includes an input shaft 1210 operatively connected to the driving source 1400 and input gear 1281 supported on the input shaft 1210 in a relatively non-rotatable manner, in addition to the above-mentioned configuration, as shown in FIGS. 14 and 18.

The input gear 1281 forms a gear train 1280 that transmits driving power from the input shaft 1210 to the first and the second pump shafts 1310a, 1310b together with the first and the second transmission gears 1281 a, 1281b.

Figure 20:
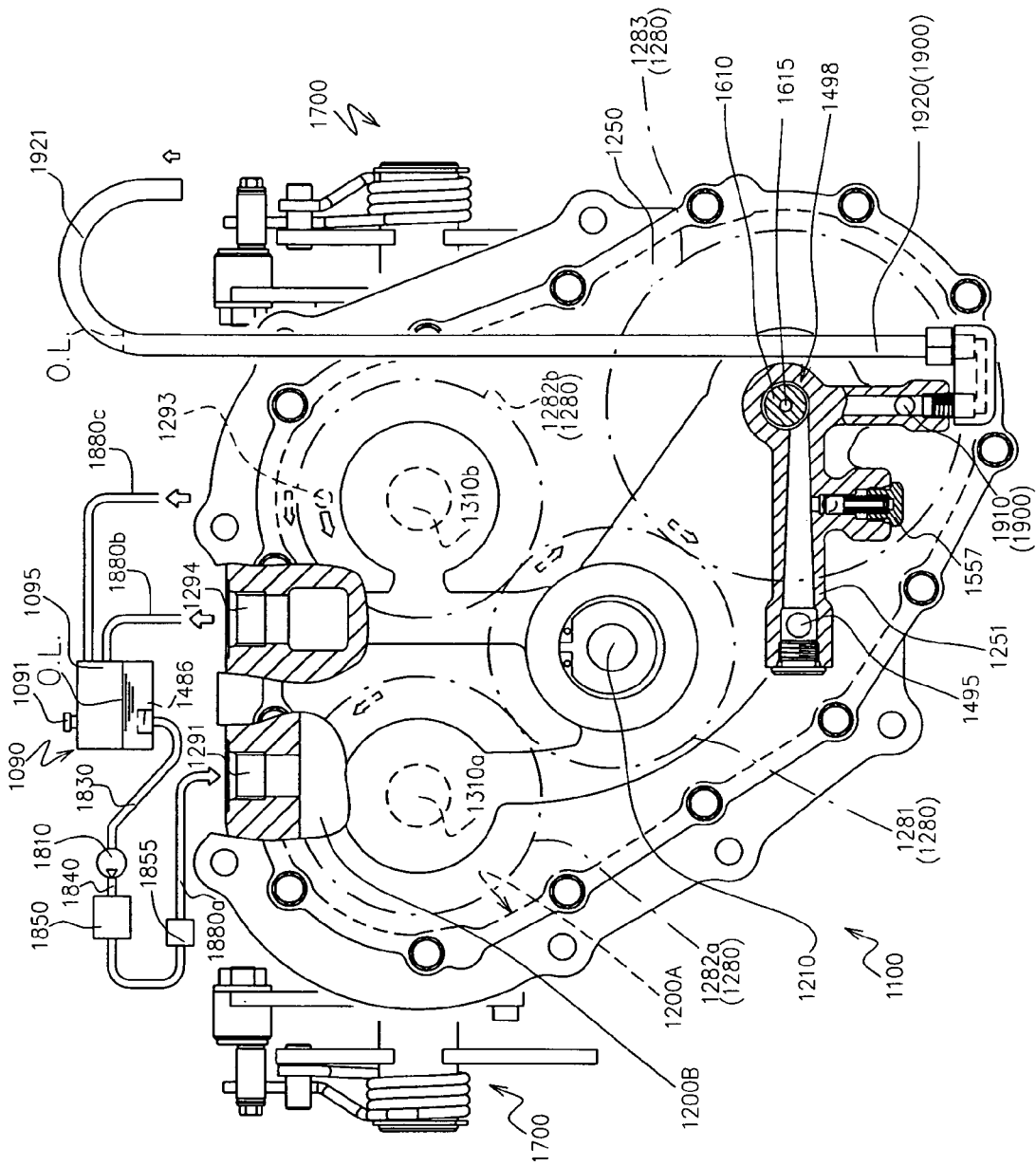
FIG. 20 is a rear view of the pump unit of the second embodiment.

FIG. 20 is a rear view (end elevation view as viewed from the input side) of the pump unit.

Incidentally, the arrow mark shown in broken line in FIG. 20 indicates the rotating direction of each gear that forms the gear train 1280.

As shown in FIG. 18 through FIG. 20, the input shaft 1210 is supported by the second end wall 1251 and the first end wall 1241 in such a manner that its one end protrudes outwards.

And, as shown in FIG. 18 through FIG. 20, the input gear 1281 is supported by the input shaft 1210 in the relatively non-rotatable manner in the gear accommodating chamber 1200A so as to be engaged with the first and the second transmission gears 1282a, 1282b.

Incidentally, in the pump unit 1100 of the present embodiment, the PTO clutch mechanism 1600A inputs the driving power from the driving source 1040 via a PTO gear 1283 engaged with the input gear 1281.

The PTO gear 1283 forms the gear train 1280 together with the input gear 1281, the first transmission gear and the second transmission gears 1282a, 1282b.

That is, the PTO clutch mechanism 1600A, as shown in FIGS. 17 and 20, includes a driving-side member 1620 which is supported in the relatively rotatable manner by the PTO shaft 1610 and which is equipped with the PTO gear 1283, a driven-side member 1630 which is supported by the PTO shaft 1610 in the relatively non-rotatable manner, a frictional plate group 1640 that includes driving-side frictional plates supported by the driving-side member 1620 in the relatively non-rotatable manner and driven-side frictional plates supported by the driven-side member 1630 in the relatively non-rotatable manner, and a push-to-move member 1650 which selectively friction-engages the driving-side friction plates and the driven-side friction plates by the hydraulic action. The PTO clutch mechanism 1600A is so configured that the power transmission from the driving source 1040 to the PTO shaft 1610 can be contrarily connected or disconnected by turning ON/OFF the hydraulic action to the press-to-move member 1650.

In the present embodiment, the PTO clutch mechanism 1600A is of a hydraulic operation type in which the power transmission is engaged when oil pressure is supplied, and further includes a biasing member 1660 that prevents the friction plate group 1640 from being unintentionally friction-engaged when oil pressure is not supplied.

More preferably, the pump unit 1100 can be equipped with a PTO brake mechanism 1600B which applies braking force to the PTO shaft 1610, the PTO brake mechanism 1600B being linked with the PTO clutch mechanism 1600A so as to work contrarily to the PTO clutch mechanism 1600A (see FIGS. 14 and 17).

Although, as described above, the pump unit 1100 of the present embodiment includes the input shaft 1310 which is independent from the first and the second pump shafts 1310a, 1310b, needless to say, it is possible to have the end of either one of the first and the second pump shafts 1310a, 1310b extended outwards from the housing 1200, and utilize the pump shaft which has the outward extending end as the input shaft.

The first hydraulic pump main body 1300a, as shown in FIGS. 16 and 19, includes a first cylinder block 1320a supported by the first pump shaft 1310a in the relatively non-rotatable manner within the pump accommodating chamber 1200B, and a first piston unit 1330a accommodated within the first cylinder block 1320a in the relatively non-rotatable manner and in the relatively slidable manner in an axial direction.

The second hydraulic pump main body 1300b has substantially the same configuration as that of the first hydraulic pump main body 1300a.

Consequently, detail description of the second hydraulic pump main body 1300b will be properly omitted by replacing the end reference character "a" of the first hydraulic pump main body 1300a with "b".

The pump unit 1100 is so configured that the inner space of the housing 1200 could store oil as described above. In addition to that, the pump unit 1100 has the following configuration so that the oil introduced into the housing is not stagnated or pooled at the same position within the housing 1200, but is efficiently circulated.

Specifically, the housing 1200 includes an inlet port 1291 that introduces oil from the outside into the pump accommodating chamber 1200B (see FIGS. 19 and 20), an oil passage 1293 (see FIG. 17) that flows the oil inside the pump accommodating chamber 1200B into the gear accommodating chamber 1200A, and a discharge port 1294 (see FIG. 18) to take out the oil inside the gear accommodating chamber 1200A to the outside. The housing 1200 is so configured that oil introduced through the inlet port 1291 into the pump accommodating chamber 1200B is flown into the gear accommodating chamber 1200A via the oil passage 1293 and then, is discharged to the outside via the discharge port 1294.

In the present embodiment, the discharge port 1294 is fluidly connected to an external tank 1090 via an external conduit 1880b (see FIGS. 13, 14 and 20).

Preferably, as shown in FIG. 20, a breather mechanism 1091 is provided in the external tank 1090.

With this configuration, oil supplied through the inlet port 1291 cools the first and the second hydraulic pump main body 1300a, 1300b in the pump accommodating chamber 1200B, and is then discharged to the outside from the gear accommodating chamber 1200A, thereby preventing stagnation or pooling at the same position of the oil stored inside the housing 1200 and improving the cooling efficiency of the first and the second hydraulic pump main bodies 1300a, 1300b.

Furthermore, with this configuration, a flow of oil from the gear accommodating chamber 1200A into the pump accommodating changer 1200B can be prevented.

Consequently, it is possible to effectively prevent impurities such as iron powder, etc., which are generated from the gear train 1280 such as the first and the second transmission gears 1282a, 1282b and the input gear 1281, etc. and the PTO clutch mechanism 1600A, from exerting detrimental effects on the first and the second hydraulic pump main bodies 1300a, 1300b.

Incidentally, the working vehicle 1100 is so configured that return oil of operating oil for the working machine discharged from an auxiliary pump unit 1800 later discussed is supplied to the inlet port 1291 of the housing 1200 in the state cooled by an oil cooler 1855, thereby further improving cooling efficiency of the first and the second hydraulic pump main bodies 1300a, 1300b.

Preferably, as shown in FIGS. 19 and 20, the oil passage 1293 may be provided at such a position that the pump action by at least one gear which forms the gear train 1280 can be utilized in order to enhance the oil flow from the pump accommodating chamber 1200B into the gear accommodating chamber 1200A.

In the present embodiment, as shown in FIGS. 19 and 20, the oil passage 1293 is disposed in such a manner to open to the end face of the second transmission gear 1282b so that a flow of oil from the pump accommodating chamber 1200B into the gear accommodating chamber 1200A is carried out by utilizing the pump action associated with a rotation of the second transmission gear 1282b, in addition to mere overflow.

Furthermore, in this embodiment, the pump unit 1100 is equipped with an air intake mechanism 1900 that takes in air into the gear accommodating chamber 1200A, in addition to the above-mentioned configuration.

The air intake mechanism 1900 is so configured to suck air into the gear accommodating chamber 1200A by utilizing the pump action by at least one gear that forms the gear train 1280.

By equipping the air intake mechanism 1900, it is possible to reduce power loss caused by the stored oil in the gear accommodating chamber 1200A, in addition to the effect of improved cooling efficiency of the first and the second hydraulic pump main bodies 1300a, 1300b and prevention of oil backflow from the gear accommodating chamber 1200A to the pump accommodating chamber 1200B.

That is, the stored oil in the gear accommodating chamber 1200A gives rise to rotational resistance against the gears which form the gear train 1280. Such rotational resistance is proportional to the amount of the stored oil in the gear accommodating chamber 1200A.

In view of this, the pump unit 1100 of the present embodiment is equipped with the air intake mechanism 1900, so that the amount of the stored oil within the gear accommodating chamber 1200A is reduced to prevent power loss.

Specifically, as shown in FIGS. 17 and 20, the air intake mechanism 1900 includes an air intake port 1910 provided in the housing 1200 so as to communicate the gear accommodating chamber 1200A with the outside, and a tubular member 1920 whose base end is connected to the air intake port 1910.

The air intake port 1910 is provided at a position where air is sucked by utilizing the pump action by the one gear.

That is, the air intake port 1910 is formed in the housing 1200 so as to be opened to the end face of the one gear or opened to the vicinity of the peripheral surface of the one gear.

Preferably, the air intake port 1910 may be provided at a position where the pump action by the gear located at the lowermost position in a state that the pump unit 1100 is mounted, out of the gears that form the gear train 1280, could be utilized.

By equipping this configuration, air taken in through the air intake port 1910 can be diffused throughout the whole space of the gear accommodating chamber 1200A, thereby effectively reducing the amount of the stored oil in the gear accommodating chamber 1200A.

In the present embodiment, as shown in FIGS. 17 and 20, the PTO gear 1283 is located at the lowermost position in a state that the pump unit 1100 is mounted.

Consequently, the air intake port 1910 is opened to the end face of the PTO gear 1283 so that air is sucked by the pump action associated with rotation of the PTO gear 1283.

The tubular member 1920 has the base end connected to the air intake port 1910, and a tip end opened to the outside with being bent in the inverted U-letter shape.

Preferably, the tubular member 1920 could have a portion 1921 which is higher than the oil level O. L. of a reserve tank 1090 fluidly connected to the discharge port 1294 between the base end and the head end in a state that the one gear is not rotated (see FIG. 20).

By equipping this configuration, it is possible to prevent the oil stored in the gear accommodating chamber 1200A from flowing out to the outside through the tubular member 1920 when rotation of the gear train 1280 is stopped.

In the present embodiment, the tubular member 1920 is formed by the material with rigidity such as a steel pipe, etc., and the base end of the tubular member 1920 is supported by the housing 1200, but it is possible to use elastic conduit as the tubular member and to support the elastic conduit with another member such as a vehicle frame so as to be upright.

Figure 21:
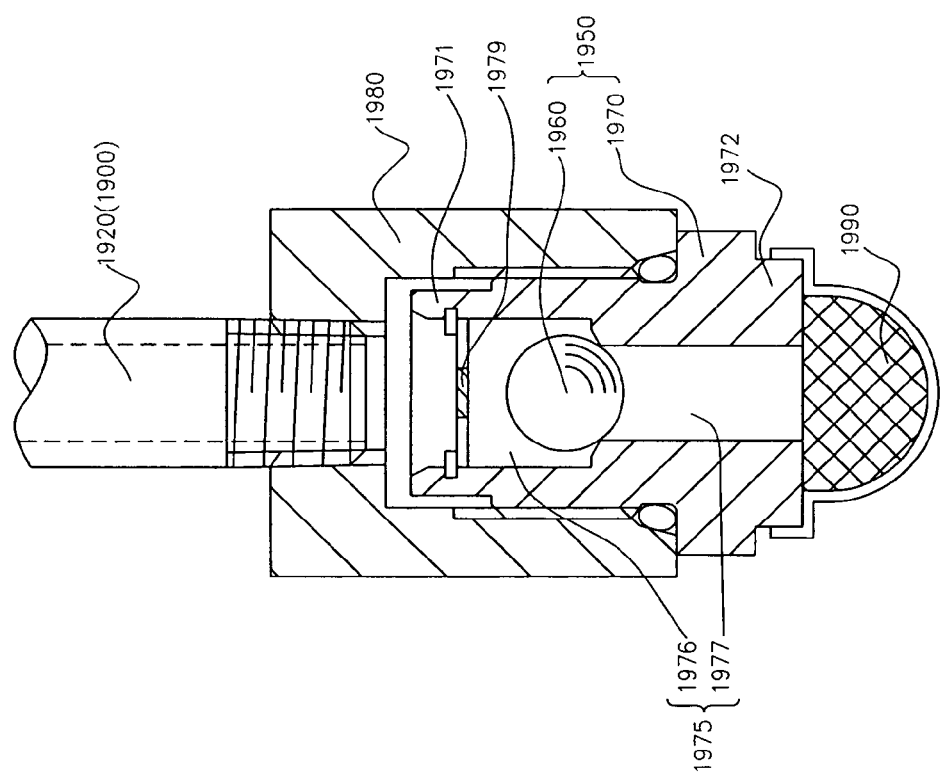
FIG. 21 is an enlarged cross-sectional view of a tip end of a tubular member in an air intake mechanism which is provided with the pump unit.

FIG. 21 is an enlarged cross-sectional view of the tip end of the tubular member 1920.

Preferably, as shown in FIG. 21, a one-way valve for allowing air-suck from the outside and preventing outflow of oil from the gear accommodating chamber 1200A may be provided at the tip end of the tubular member 1920.

The one-way valve can effectively prevent oil from flowing out from the gear accommodating chamber 1200A even when the working vehicle 1001 to which the pump unit 1100 is applied is tilted on a sloping ground, etc.

Specifically, in the present embodiment, the pump unit 1100 includes a one-way valve unit 1950 having a ball member 1960 which functions as the one-way valve and a case member 1970 in which the ball member 1960 is mounted.

By the way, reference numeral 1980 in FIG. 21 denotes a connection member for connecting the case member 1970 to the tip end of the tubular member 1920.

The case member 1970 is formed into a hollow shape which has a base end 1971 fluidly connected to the outer opening end of the tubular member 1920, a tip end 1972 opened to the outside, and a through hole 1975 which passes through between the base end 1971 and the tip end 1972.

The through hole 1975 includes a large-diameter section 1976 provided on the base end 1971 side and having a diameter greater than that of the ball member 1960, and a small-diameter section 1977 provided on the tip end 1972 side and having a diameter smaller than that of the ball member 1960. The ball member 1960 is installed in the large-diameter section 1976.

Furthermore, the case member 1970 includes a holding plate 1979 which holds the ball member 1960 in such a manner to allow the ball member 1960 to move in the specified distance within the large diameter section 1976.

The holding plate 1979 is provided with an opening which has a size that allows air intake while preventing the detachment of the ball member 1960.

More preferably, the air intake mechanism 1900 may include a filter 1990 which prevents foreign matter from being sucked from the outside into the gear accommodating chamber 1200A.

In the present embodiment, as described above, the pump unit 1100 has the one-way valve unit 1950.

Consequently, the filter 1990 is mounted to the tip end 1972 of the case member 1970 (see FIG. 21).

Figure 22:
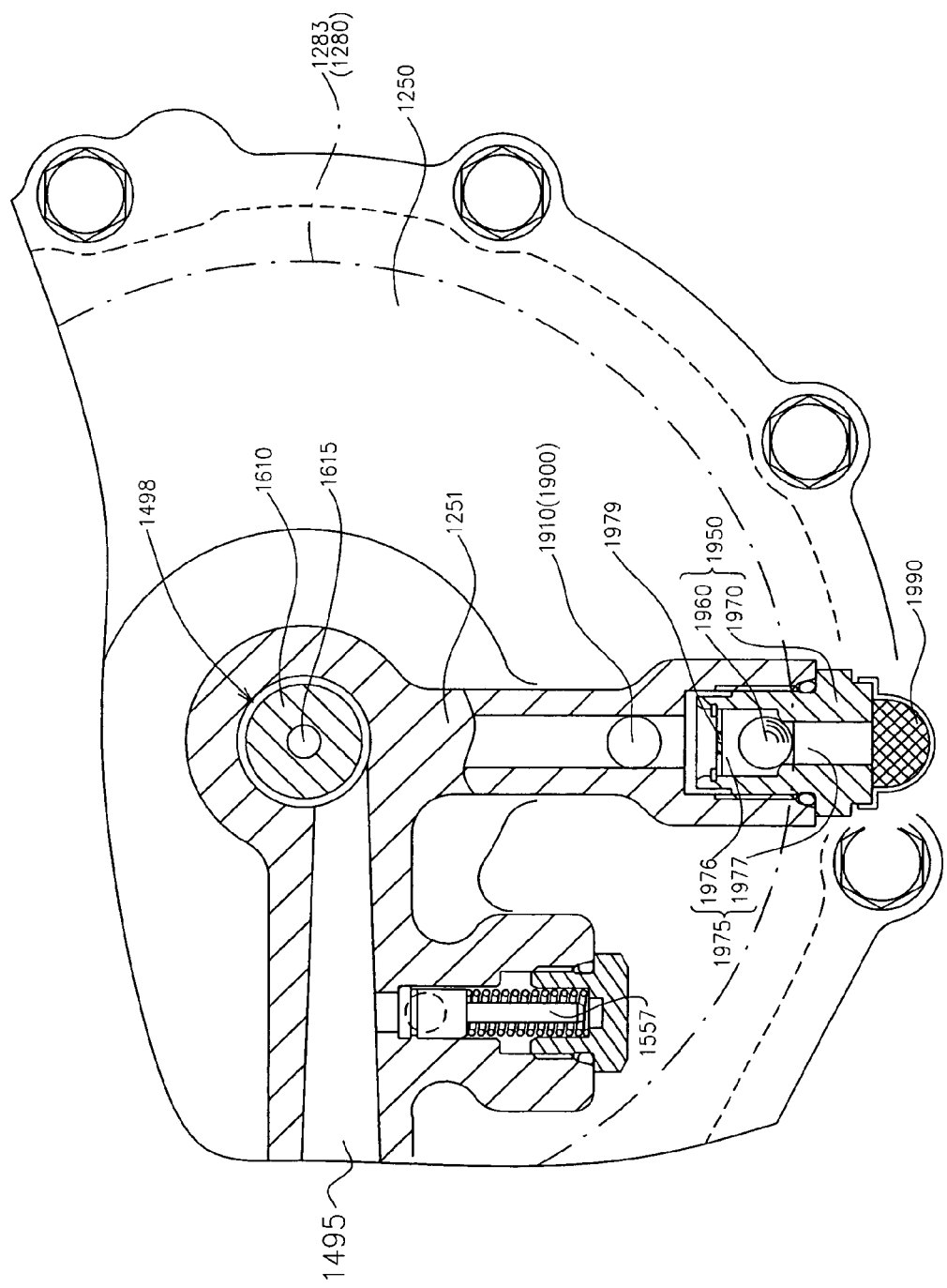
FIG. 22 is a partially cross-sectional rear view of a modified pump unit according to the present invention.

In the present embodiment, the one-way valve unit 1950 is mounted to the tip end of the tubular member 1920 (see FIG. 21). Needless to say, the one-way valve unit 1950 may be directly mounted to the housing 1200 so that the tubular member 1920 is omitted (see FIG. 22).

Furthermore, in the present embodiment, as shown in FIG. 17, the housing 1200 includes a second discharge port 1295 for taking out oil inside the pump accommodating chamber 1200B to the outside.

The second discharge port 1295, as shown in FIGS. 14 and 20, is fluidly connected to the external tank 1090 via an external conduit 1880c.

With the second discharge port 1295, it is possible to prevent nonconformity, which is caused in a case that the internal pressure of the stored oil in the pump accommodating chamber 1200B rises when the oil introduced into the pump accommodating chamber 1200B is greater than the oil which flows from the pump accommodating chamber 1200B to the gear accommodating chamber 1200A and flows out via the discharge port 294, from occurring in the hydraulic line connected to the inlet port 1291.

That is, in the present embodiment, the oil passage 1293 is designed to have an orifice-like shape to control the amount of passing oil so as to prevent a large amount of oil from flowing from the pump accommodating chamber 1200B into the gear accommodating chamber 1200A. Consequently, it may be occurred that the amount of oil discharged from the pump accommodating chamber 1200B is smaller than the amount of oil flowing into the pump accommodating chamber 1200B. In view of this, a second discharge port 1295 is provided to discard the excess.

The pump unit 1100 employs a first and a second trunnion type movable swash plates as the first and the second output-adjusting members 1350a, 1350b, thereby reducing sliding friction of the output adjustment members so that the force required to operate the output adjustment members is reduced.

Specifically, the first trunnion type movable swash plate 1350a, as shown in FIG. 16, includes a first operational end 1351a supported in the relatively rotatable manner on a first operational axis X1 by the housing 1200 in the accessible state from the outside of the housing 1200, a first base end 1352a oppositely arranged to the first operational end 1351a with the first hydraulic pump main body 1300a in-between so that the first base end 1352a is located coaxially with the first operational axis X1, and a first swash plate 1353a which extends between the first operational end 1351a and the first base end 1352a in a contact state with the first piston unit 1330a so as to define a sliding range of the first piston unit 1330a. The first trunnion type movable swash plate 1350a is so configured that the first swash plate 1353a is tiltably rotated around the first operational axis X1 by operating the first operational end 1351a so that the suction/discharge oil quantity of the first hydraulic pump main body 1300a is varied.

The second trunnion type movable swash plate 1350b has substantially the same configuration as that of the first trunnion type movable swash plate 1350a. Consequently, detail description of the second trunnion type movable swash plate 1350b will be properly omitted by replacing the end reference character "a" of the first trunnion type movable swash plate 1350a with "b".

In the pump unit 1100 of the present embodiment, the first and second trunnion type movable swash plates 1350a, 1350b are supported by the housing 1200 in such a manner that each of the operational ends 1351a, 1351b faces opposite to each other.

In particular, as shown in FIG. 16, the housing 1200 includes a dividing wall 1202 which divides the pump accommodating chamber 1200B into a first pump space 1200B(1) for accommodating the first hydraulic pump main body and a second pump space 1200B(2) for accommodating the second hydraulic pump main body.

The first and the second trunnion type movable swash plates 1350a, 1350b are supported by the dividing wall 1202 at the base ends 1352a, 1352b so that the operational ends 1351a, 1351b are directed to opposite directions with each other.

Incidentally, reference numeral 1700 in FIGS. 15 and 16 denotes a neutral position return unit which returns the corresponding trunnion type movable swash plates 1350a, 1350b to the neutral position.

Specifically, the dividing wall 1202 extends from the first end wall 1241 along the axial direction of the first and the second pump shafts 1310a, 1310b between the first and the second hydraulic pump main bodies 1300a, 1300b.

As shown in FIG. 16, the dividing wall 1202 is provided with a first bearing portion 1203a that supports the base end 1352a of the first trunnion movable swash plate 1350a at the surface facing to the first hydraulic pump main body 1300a, and a second bearing portion 1203b that supports the base end 1352b of the second trunnion movable swash plate 1350b at the surface facing to the second hydraulic pump main body 1300b.

Incidentally, the first peripheral wall 1242 is provided with a first and a second through holes 1204a, 1204b so as to face to the first and the second bearing portions 1203a, 1203b, respectively (see FIG. 16).

The first and the second through holes 1204a, 1204b, respectively, serve as insertion holes to insert the base ends 1352a, 1352b and the swash plates 1353a, 1353b of the first and the second trunnion type movable swash plates 1350a, 1350b.

And the operational ends 1351a, 1351b of the first and the second trunnion type movable swash plates 1350a, 1350b are supported by the cap member 1205 mounted to the first and the second through holes 1204a, 1204b, respectively so that the operational ends 1351a, 1351b face to opposite directions to each other in the state accessible from the outside.

That is, the first trunnion type movable swash plate 1350a is supported oscillably around the first operational axis X1 by the first bearing portion 1203a formed at the dividing wall 1202 and the cap member 1205 mounted to the first through hole 1204a of the first peripheral wall 1242 so that the operational end 1351a faces to one side in the vehicle width direction.

As against this, the second trunnion type swash plate 1350b is supported oscillably around the second operational axis X2 by the second bearing portion 1203b formed at the dividing wall 1202 and the cap member 1205 mounted to the second through hole 1204b of the first peripheral wall 1242 so that the operational end 1351b faces to the other side in the vehicle width direction.

In such a configuration in which the pump accommodating chamber 1200B is divided into the first and the second pump spaces 1200B(1), 1200B(2) by the dividing wall 1202, it is preferable to allow oil to flow between the first pump space 1200B(1) and the second pump space 1200B(2), to provide the inlet port 1291 at one of the first and the second pump spaces 1200B(1), 1200B(2), and to provide the oil passage 1293 at the other of the first and the second pump space 1200B(1), 1200B(2).

In the present embodiment, the inlet port 1291 is provided in such a manner that oil from the outside is flown into the first pump space 1200B(1) (see FIGS. 15 and 19), and the oil passage 1293 is provided in such a manner that the oil inside the pump accommodating chamber 1200B is flown from the second pump space 1200B(2) into the gear accommodating chamber 120A (see FIG. 17).

With this configuration, oil introduced through the inlet port 1291 into the first pump space 1200B(1) of the pump accommodating chamber 1200B flows into the second pump space 1200B(2) via a communicating passage 1292, then flows into the gear accommodating chamber 1200A via the oil passage 1293, and finally is discharged to the outside via the discharge port 1294.

Consequently, oil supplied through the inlet port 1291 is discharged to the outside from the gear accommodating chamber 1200A after cooling the first hydraulic pump main body 1300a in the first pump space 1200B(1) and the second hydraulic pump main body 1300b in the second pump space 1200B(2), thereby preventing stagnation of the oil stored inside the housing 1200 and improving the cooling efficiency of the first and the second hydraulic pump main bodies 1300a, 1300b.

In the present embodiment, as shown in FIGS. 15 16, and 18, the dividing wall 1202 has a groove that opens outwards at its free end. The groove forms the communicating passage 1292 that fluidly communicates between the first pump space 1200B(1) and the second pump space 1200B(2).

Preferably, the dividing wall 1202 may be configured so that at least part of the free end thereof is brought into contact with the plate member 1360, as shown in FIG. 18.

By configuring to bring at least part of the free end of the dividing wall 1202 to come in contact with the plate member 1360, the plate member 1360 is able to be stably connected to the housing main body 1230, thereby effectively preventing or reducing leakage of the operating oil from the contact area between the plate member 1360 and the first and the second hydraulic pump main bodies 1300a, 1300b.

Incidentally, in the present embodiment, the groove is formed at the free end of the dividing wall 1202 so that the communicating passage 1292 is formed between the dividing wall 1202 and the plate member 1360, but needless to say, in place of or in addition to the groove, a through hole may be provided in the dividing wall 1202.

In addition, a groove may be provided in the portion opposite to the dividing wall 1202 in the plate member 1360 so that the first pump space 1200B(1) and the second pump space 1202B(2) are fluidly communicated via the groove in the plate member 1360.

Now, a hydraulic circuit of the pump unit 1100 of the present embodiment will be described.

As shown in FIGS. 14, 16 and 19, the plate member 1360 includes a pair of first operating oil passages 1410a which form a part of the pair of first operating oil lines 1400a, a first bypass passage 1430a which communicates between the pair of first operating oil passages 1410a and into which a bypass valve 1435 for selectively connecting/disconnecting the first bypass passage 1430a is interposed, a pair of second operating oil passages 1410b which form a part of the pair of second operating oil line 1400b, a second bypass passage 1430b which communicates between the pair of second operating oil passages 1410b and into which a bypass valve 1435 for selectively connecting/disconnecting the second bypass passage 1430b is interposed.

Furthermore, the plate member 1360, as shown in FIG. 14, includes a common charge passage 1421 which has a first end opened to the outside surface to form a charge port 1420P, and a branched charge passage 1422 which is communicated with the common charge passage 1421 and extends so as to cross over the pair of first operating passages 1410a and the pair of second operating oil passages 1410b.

Incidentally, at the portions which communicates the pair of first operating oil passage 1410a and the pair of second operating oil passages 1410b with the branched charge passage 1422, check valves 1425 are interposed, respectively.

The check valve 1425 is equipped to allow pressurized oil to flow from the branched charge passage 1422 to the pair of first operating oil passage 1410a and the pair of second operating oil passage 1410b, respectively, and to prevent the backflow.

Incidentally, in the present embodiment, the check valve 1425 has a relief valve function (see FIG. 14) that operates when abnormally high pressure occurs inside the corresponding operating oil passages 1410a, 1410b.

The pair of first operating oil passages 1410a are formed substantially in parallel to each other with a corresponding first pump shaft 1310a in-between.

In particular, the pair of first operating oil passages 1410a, respectively, have first ends opened to the outside surface (top surface in the present embodiment) on one side of the plate member 1360 so as to form a pair of first operating oil ports 1411a (see FIG. 15), second ends opened to the outside surface (bottom surface in the present embodiment) on the other side of the plate member 1360, and center portions which form kidney ports fluidly connected to the first hydraulic pump main body 1300a.

And openings at the second ends of the pair of first operating oil passages 1410a are sealed via the check valves 1425 (see FIG. 19).

Similarly, the pair of second operating oil passages 1410b are formed substantially in parallel to each other with a corresponding second pump shaft 1310b in-between.

In particular, the pair of second operating oil passages 1410b have first ends opened to the outside surface (top surface in the present embodiment) on one side of the plate member 1360b to form a pair of second operating oil ports 1411b, second ends opened to the outside surface (bottom surface in the present embodiment) on the other side of the plate member 1360, and center portions which form kidney ports fluidly connected to the second hydraulic pump main body 1300b.

And openings at the second ends of the pair of second operating oil passages 1410b are sealed via the check valves 1425.

Furthermore, the plate member 1360, as shown in FIG. 14, includes a first flushing passage 1440a which communicates a first rearward-movement high-pressure-side operating oil passage 1410a(R) at which a pressure becomes low during the forward travel, out of the pair of first operating oil passages 1410a, with an oil sump (inner space of the housing 1200), the first flushing passage 1440a having a first flushing valve 1445a interposed therein, and a second flushing passage 1440b which communicates a second rearward-movement high-pressure-side operating oil passage 1410b (R) at which a pressure becomes low during the forward travel, out of the pair of second operating oil passages 1410b(R), with the oil sump, the second flushing passage 1440b having a second flushing valve 1445b interposed therein.

The first and the second flushing valves 1445a, 1445b are configured to operate in a state that oil pressures of forward-movement high-pressure-side operating oil passages 1410a (F), 1410b(F) at which pressures become high during the forward travel, out of the pair of first operating oil passage 1410a and the pair of second operating oil passage 1410b, are used as pilot pressures, so that the oil of the rearward-movement high-pressure-side operating oil passages 1410a (R), 1410b(R) are returned into the oil sump through orifices in the event that the oil pressures of the forward-movement high-pressure-side operating oil passages 1410a(F), 1410b (F) exceed a predetermined pressure.

With such a configuration, flushing action which promotes replenishment of operating oil from the common charge passage 1421 and the branched charge passage 1422 into low-pressure-side operating oil passages out of the pair of first operating oil passages 1410a and the pair of second operating oil passages 1410b could be functioned, thereby effectively preventing temperature rise of operating oil of the pair of first operating oil line 1400a and the pair of second operating oil line 1400b.

The plate member 1360, as shown in FIG. 14, further includes a self-suction passage 1450 and a check valve 1455. The self-suction passage 1450 is so configured to self-suck oil from the oil sump (inside space of the housing 1200) into either one of the pair of first operating oil lines 1400a or either one of the second operating oil lines 1400b that becomes negative pressure in the event that a charge pump main body 1510 later discussed is stopped. The check valve 1455 is so configured to allow the oil to flow from the oil sump into the negative pressure line of the pair of first operating oil lines 1400a or the negative pressure line of the pair of second operating oil lines 1400b while preventing backflow.

Specifically, for example, when a working vehicle is parked on a sloping road and the engine 1040 is stopped with HST at the neutral state, rotating force are applied to motor shafts operatively connected to the driving wheels 1050 so that hydraulic motor units 1010, 1020 attempt to perform pumping action.

In a case that the pair of first operating oil lines 1400a and the pair of second operating oil line 1400b are filled with operating oil, even if the pumping actions by the hydraulic motor units 1010, 1020 are occurred, braking forces are applied to the hydraulic motor units 1010, 1020 through the operating oil. However, at the same time, the pumping actions by the hydraulic motor units 1010, 1020 cause one of the pair of first operating oil lines 1400a and one of the pair of the second operating oil lines 1400b to have high pressures, which result in a fear of leakage of operating oil from the high-pressure side operating oil lines.

If the leakage of operating oil from the high-pressure side operating lines occurs, oil circulation from the negative-pressure side operating oil line to the high-pressure side operating oil line occurs, and the leakage from the high-pressure side operating oil line is promoted. And finally, the operating oil in the pair of first operating oil line 1400a and the pair of second operating oil line 1400b is exhausted, the driving wheels 1050 begin to rotate freely, and the vehicle begins to descend the sloping road (free wheel phenomenon).

On the other hand, in the pump unit of the present embodiment, the self-priming passage 1450 automatically sacks oil from the oil sump (inside space of the housing 1200 in the illustrated embodiment) and replenishes the same into the operating oil line whose pressure has been become negative, out of the pair of first operating oil lines 1400a and the pair of second oil lines 1400b.

Consequently, the free wheel phenomenon can be effectively prevented.

In the present embodiment, the pump unit 1100, as shown in FIGS. 14, 16 and 17, includes a charge pump unit 1500 driven by one of the first and the second pump shafts 1310a, 1310b (in the present embodiment, second pump shaft 1310b), in addition to the above-mentioned configuration.

In particular, the charge pump unit 1500 includes a charge pump main body 1510 driven by the second pump shaft 1310b, and a charge pump case 1520 connected to the plate member 1360 in such a manner as to surround the charge pump main body 1510.

As shown in FIGS. 16 and 17, in the present embodiment, the second pump shaft 1310b is so configured that its transmission direction downstream end, which is opposite to the transmission direction upstream end that supports the second transmission gear 1282b, passes through the plate member 1360 to extend toward the outside.

And the charge pump main body 1510 is driven by the outer extended section of the second pump shaft 1310b.

The charge pump case 1520, as shown in FIG. 16, has a shape nearly equal to the size of the plate member 1360 and is removably connected to the plate member 1360 with one end face superimposed on the outer surface of the plate member 1360 (surface opposite to the first housing member 1240 of the plate member 1360).

Incidentally, the other end face on the side opposite to the one end face of the charge pump case 1520 is so configured that an area corresponding to the second pump shaft 1310b forms a mount face for an auxiliary pump unit 1800 later discussed (hereinafter called the auxiliary pump unit mount face 1800a), and an area corresponding to the first pump shaft 1310a forms a mount face for a line filter 1530 later discussed (hereinafter called the line filter mount face 1530a).

The charge pump case 1520 forms therein the following passages including suction/discharge passage to the charge pump main body 1510.

Specifically, as shown in FIG. 14, FIG. 15, and FIGS. 17 to 19, the charge pump case 1520 includes: a suction passage 1480 which has a first end opened to the outer surface (top surface in the present embodiment) to form a suction port 1480 in and a second end communicated with the suction port of the auxiliary pump main body 1510; an unfiltered discharge passage 1481 which has a first end communicated with the discharge port of the auxiliary pump main body 1510 and a second end opened to the line filter mount face 1530a so as to be communicated with the inlet port 1530 in of the line filter 1530; a filtered discharge passage 1482 opened to the line filter mount face 1530a so as to be communicated with the outlet port 1530 out of the line filter 1530; a resistance valve 1475 whose primary side is communicated with the filtered discharge passage 1482; a charge discharge passage 1483 which has a first end communicated with the secondary side of the resistance valve 1475 and a second end opened to the contact surface with the plate member 1360 so as to be communicated with the charge port 1420P; a charge relief valve 1540 interposed in the charge discharge passage 1483; a first PTO passage 1491 which has a first end communicated with the filtered discharge passage 1482; a PTO solenoid valve 1556 whose primary side is communicated with the first PTO passage 1491; a second PTO passage 1492 which has a first end communicated with the secondary side of the PTO solenoid valve 1556 and a second end opened to the contact surface with the plate member 1360; a first PTO drain passage 1556a which has a first end communicated with a drain port of the PTO solenoid valve 1556 and a second end communicated with the internal space of the housing 1200 via a passage formed in the plate member 1360; and an accumulator 1558 interposed into the second PTO passage 1492.

The suction port 1480in is fluidly connected to an external tank 1090 with a strainer 1486 incorporated therein via an external conduit 1485 (see FIGS. 13 and 14).

The charge discharge passage 1483 forms a charge line to replenish operating oil from the charge pump main body 1510 to the pair of first operating oil passages 1410a and the pair of second operating oil passages 1410b together with the common charge passage 1421 and the branched charge passage 1422 provided in the plate member 1360.

The first and the second PTO passages 1491, 1492 form a part of the PTO line 1490 (see FIG. 14) that feeds operating oil from the charge pump main body 1510 to the PTO clutch mechanism 1600A.

That is, in the present embodiment, as shown in FIGS. 17, 18, and 20, the PTO line 1490 includes, in addition to the first and the second PTO passages 1491, 1492, a third PTO passage 1493 formed in the plate member 1360; a forth PTO passage 1494 formed in the first housing member 1240; an inner conduit 1499 that extends between the first end wall 1241 of the first housing member 1240 and the second end wall 1251 of the second housing member 1250; a fifth PTO passage 1495 formed in the second housing member 1250; a rotary joint 1498 provided in the contact section between the second end wall 1251 and the PTO shaft 1610; and a PTO axial hole 1615 drilled in the PTO shaft 1610.

The third PTO passage 1493, as shown in FIG. 18, has a first end opened to the contact surface with the charge pump case 1520 so as to be communicated with second end of the second PTO passage 1492, and a second end opened to the contact surface with the first housing member 1240.

The forth PTO passage 1494, as shown in FIG. 18, has a first end opened to the contact surface with the plate member 1360 so as to be communicated with the second end of the third PTO passage 1493, and a second end opened to the gear accommodating chamber 1200A.

The fifth PTO passage 1495, as shown in FIGS. 18 and 20, has a first end opened to the gear accommodating chamber 1200A, and a second end opened to the inner circumferential surface of a bearing hole which bearing-supports the PTO shaft 1610.

The internal piping 1499, as shown in FIG. 18, is disposed in the gear accommodating chamber 1200A so as to communicate the second end of the fourth PTO passage 1494 with the first end of the fifth PTO passage 1495.

Incidentally, needless to say, it is possible to eliminate the internal conduit 1499 by having the second end of the fourth PTO passage 1494 opened to the joint surface with the second housing member 1250 and having the first end of the fifth PTO passage 1495 opened to the contact surface with the first housing member 1240.

The PTO axial hole 1615, as shown in FIG. 17, has a first end communicated with the fifth PTO passage 1495 via the rotary joint 1498, and a second end opened to the push-to-move member 1650 of the PTO clutch mechanism 1600A.

In the thus PTO line 1490, as shown in FIG. 14, the PTO solenoid valve 1556, the accumulator 1558 disposed at the downstream side of the PTO solenoid valve 1556, and a PTO relief valve 1557 disposed at the downstream side of the PTO solenoid valve 1556 are interposed.

As shown in FIG. 18, in the second end wall 1251, a leak oil passage 1497 for returning leak oil from the rotary joint 1498 into the gear accommodating chamber 1200A is formed. The air intake port 1910 is so configured to communicate the outsides and the gear accommodating chamber 1200A by using the leak oil passage 1497.

In the pump unit 1100, the charge pump case 1520, as shown in FIGS. 14 and 16, is further provided with a filter bypass valve 1470 which bypasses between the unfiltered discharge passage 1481 and the filtered discharge passage 1482 when the line filter 1530 is clogged.

By providing the filter bypass valve 1470, it is possible to prevent oil from running out at the downstream side of the line filter 1530 when the line filter 1530 is clogged.

In the present embodiment, the pump unit 1100, as shown in FIGS. 13 and 14, includes in addition to the above-mentioned configuration, an auxiliary pump unit 1800 which is operatively driven by either one of the first and the second pump shafts 1310a, 1310b (second pump shaft 1310b in the present embodiment).

The auxiliary pump unit 1800 is provided to supply operating oil to the working machine, etc. equipped to the working vehicle.

In the present embodiment, as shown in FIGS. 13, 14 and 17, the auxiliary pump unit 1800 is intended to supply operating oil to a double-acting hydraulic cylinder 1075 which is used to elevate the working machine 1070 (for example, the mower machine).

And the return oil from the working machine is introduced into the pump accommodating chamber 1200B (in the present embodiment, first pump space 1200B(1)) through the inlet port 1291 of the housing 1200, after the return oil has been cooled by an oil cooler 1855.

As shown in FIGS. 14 and 17, the auxiliary pump unit 1800 includes an auxiliary pump main body 1810 and an auxiliary pump case 1820.

The auxiliary pump main body 1810 could take various forms, but in the present embodiment, the auxiliary pump main body 1810 is a high-pressure pump of an external engaging gear-type.

In particular, the auxiliary pump main body 1810, as shown in FIG. 17, includes an auxiliary pump driving shaft 1811 operatively connected to the second pump shaft 1310b, an auxiliary pump driven shaft (not shown) disposed nearly in parallel to the auxiliary pump driving shaft 1811, and a pair of pump gears 1813 respectively supported by the auxiliary pump driving shaft 1811 and the auxiliary pump driven shaft in such a manner to engage with each other.

The auxiliary pump case 1820 is removably coupled to the auxiliary pump unit mount surface 1800a, and is configured to surround the pair of pump gears 1813 while supporting the auxiliary pump driving shaft 1811 and the auxiliary pump driven shaft.

As shown in FIG. 17, the auxiliary pump case 1820 includes a suction passage which has a first end opened to its outer surface to form a suction port 1821 and a second end communicated with one side of the engaging point of the pair of pump gears 1813, and a discharge passage which has a first end communicated with the other side of engaging point of the pair of pump gears 1813 and a second end opened to its outside surface to form a discharge port 1822.

In the present embodiment, as shown in FIGS. 13, 14 and 20, the suction port 1821 is fluidly connected to the external tank 1090 via the external conduit 1830.

The discharge port 1822 is fluidly connected via an external conduit 1840o to a valve unit 1850 with a relief valve 1851 for a working machine and a switching valve 1852 mounted therein.

And the return oil from the valve unit 1850 is introduced through the inlet port 1291 of the housing 1200 into the housing 1200 via an external conduit 1880a into which the oil cooler 1855 is interposed, thereby positively cooling the first and the second hydraulic pump main bodies 1300a, 1300b accommodated in the housing 1200.

Incidentally, reference numeral 1860 in FIGS. 13 and 14 denotes a conduit which fluidly connects the valve unit 1850 to the double-acting type hydraulic cylinder 1075 in the above-mentioned working machine 1070.

Third Embodiment

Referring now to the accompanying drawings, a third embodiment of a pump unit according to the present invention will be described in detail hereinafter.

Figure 23:
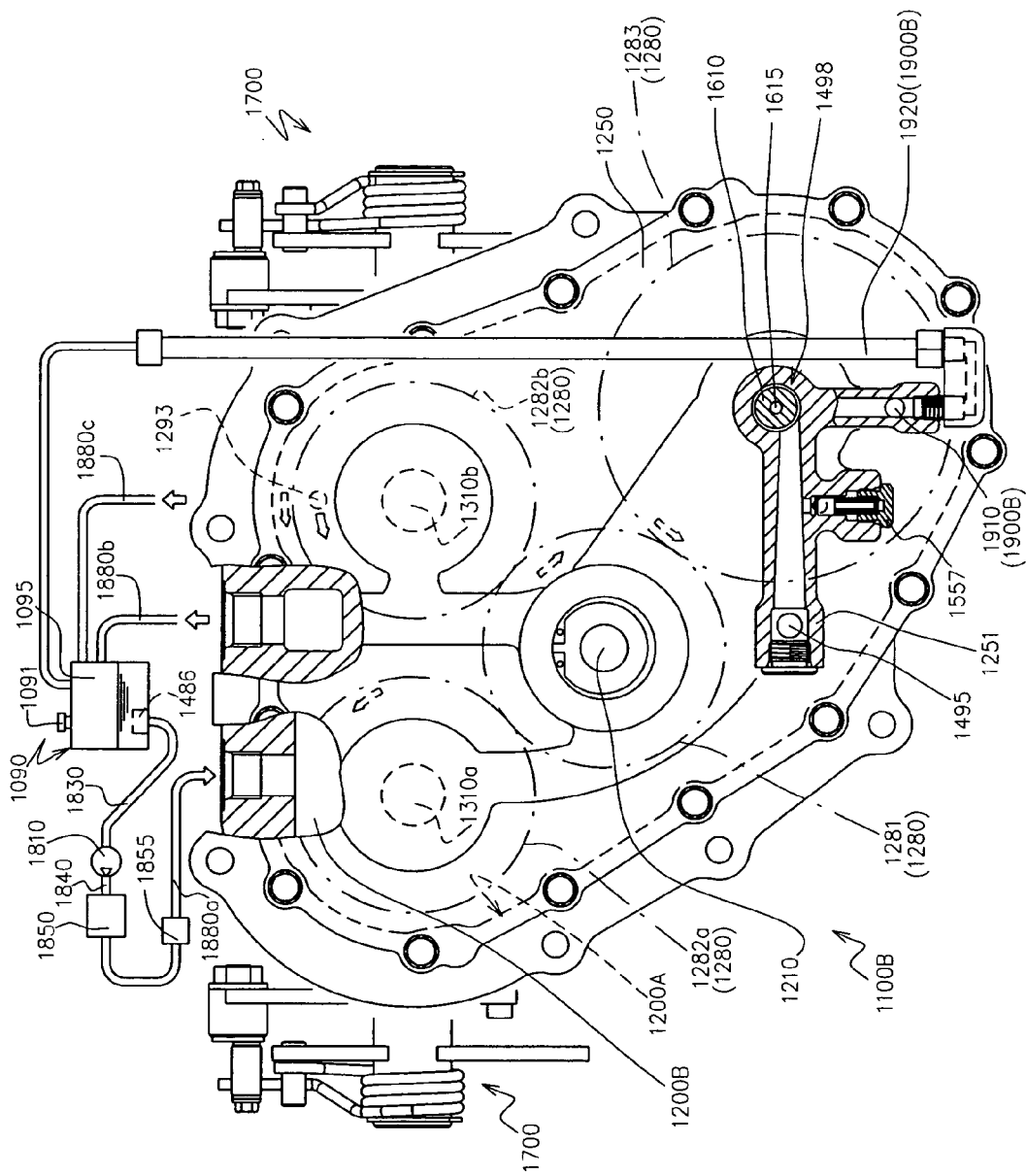
FIG. 23 is a rear view of a pump unit of a third embodiment according to the present invention.

FIG. 23 is a rear view of a pump unit 1100B of the present embodiment.

The pump unit 1100B is identical to the pump unit 1100 of the second embodiment except that the air intake mechanism 1900 is changed to an air intake mechanism 1900B.

Consequently, the description will be made only on the air intake mechanism 1900B as follows.

The components identical to those in the second embodiment will be designated by the identical reference numerals, and description thereof will be properly omitted.

The air intake mechanism 1900B includes the air intake port 1910, and a tubular member 1920B which has a base end connected to the air intake port 1910.

The tubular member 1920B has a tip end connected to an air layer 1095 of the external tank 1090.

The thus pump unit 1100B achieves the following effects in addition to the effects in the second embodiment.

That is, in the present embodiment, the air intake mechanism 1900B is configured in such a manner as to take in air from a hermetically closed circuit.

Consequently, the stored oil in the housing 1200 does not leak to the outside, and in addition, no foreign matter enters into the housing 1200 without having the filter 1990.

Fourth Embodiment

Referring now to the accompanying drawings, a fourth embodiment of a pump unit according to the present invention will be described in detail hereinafter.

FIG. 24 is a longitudinal cross-sectional side view f a pump unit 1100C of the present embodiment.

The components identical to those in the second and the third embodiments will be designated by the identical reference numerals, and description thereof will be properly omitted.

In the second and the third embodiments, the first and the second hydraulic pump main bodies 1300a, 1300b are disposed in parallel to each other. On the contrary to those, the pump unit 1100C of the present embodiment is of a tandem type in which the first and the second hydraulic pump main bodies 1300a, 1300b are disposed in series as shown in FIG. 24.

Specifically, the pump unit 1100C includes a housing 1200C, the first and the second hydraulic pump main bodies 1300a, 1300b, the first and the second pump shafts 1310a, 1310b, cradle type first and second output-adjustment members 1350Ca, 1350Cb, and a gear train 1280C.

The housing 1200C, as shown in FIG. 24, includes a base housing 1240C which forms the gear accommodating chamber 1200A and the PTO chamber 1200C, a first pump housing 1250C and a second pump housing 1260C which are respectively connected to one side and the other side of the base housing 1240C with the axial direction of the first and the second pump shafts 1310a, 1310b as the reference, a first plate member 1360C which is coupled to the first pump housing 1250C so as to form the first pump space 1200B(1), and a second plate member 1370C which is coupled to the second pump housing 1260C so as to form the second pump space 1200B(2).

The gear train 1280C includes the input gear 1281 which is non-rotatable with respect to the input shaft 1210, a transmission gear 1282C which engages with the input gear 1281, and the PTO gear 1283.

In the present embodiment, the first and the second pump shafts 1310a, 1310b are supported by the housing 1200C in such a manner to be located coaxially. The transmission gear 1282C is so configured to be supported on the opposite ends of the first and the second pump shafts 1310a, 1310b in a relatively non-rotatable manner.

In the pump unit 1100C of the present embodiment, a charge pump unit 1500C is provided in place of the charge pump unit 1500, and the auxiliary pump unit 1800 is omitted.

The charge pump unit 1500C is configured to be driven by the end on the side opposite to the input end of the input shaft 1210.

In the tandem type pump unit 1100C, as the inlet port 1291, a first and a second inlet ports 1291a, 1291b are provided to introduce oil from the outside into the first pump accommodating chamber 1200B(1) and the second pump accommodating chamber 1200B(2), respectively, and as the passage 1293, a first and a second passages 1293a, 1293b are provided to flow oil from the first and the second pump accommodating chambers 1200B(1), 1200B(2) into the gear accommodating chamber 200A.

Incidentally, needless to say, in the present embodiment, as desired or as required, either one of the air intake mechanism 1900 or the air intake mechanism 1900B may be adopted.

In the thus tandem type pump unit 1100C, same effects can be obtained as second and third embodiments.

In each of the above embodiments, explanation is made on the case with multiple hydraulic pump main bodies equipped as an example, but the present invention shall not be limited to these embodiments. It is needless to say; the present invention also shall be applied to a pump unit with a single hydraulic pump main body.

This specification is by no means intended to restrict the present invention to the preferred embodiments set forth therein. Various modifications to the pump unit may be made by those skilled in the art without departing from the spirit and scope of the present invention as defined in the appended claims.

What is claimed is:

1. A pump unit comprising:
   a housing which has an oil-storable inner space, the oil-storable inner space being divided into a pump accommodating chamber and a gear accommodating chamber by a partition wall;
   a first and a second pump shafts supported by the housing so as to cross over the gear accommodating chamber and the pump accommodating chamber in the condition parallel to each other;
   a first and a second hydraulic pump main bodies supported by the first and the second pump shafts, respectively, in such a manner to be located in the pump accommodating chamber;
   a first and a second trunnion type movable swash plates that respectively vary the suction/discharge amount of the first and the second hydraulic pump main bodies, the first and the second trunnion type movable swash plates being supported by the housing in such a manner to be operatable from the outside; and
   a first and a second transmission gears respectively supported by the first and the second pump shafts in a relatively non-rotatable manner so as to be located in the gear accommodating chamber,
   wherein the housing has an inlet port for introducing oil from the outside into the pump accommodating chamber, an oil passage for communicating between the pump accommodating chamber and the gear accommodating chamber, and a discharge port for taking out oil from the gear accommodating chamber to the outside;
   the pump accommodating chamber includes a supporting wall that supports each base end of the first and the second trunnion type movable swash plates so that each operational end of the first and the second trunnion type movable swash plates is directed to the opposite directions to each other;
   the inlet port and the oil passage are respectively provided at one side and the other side of the pump accommodating chamber with the supporting wall as a reference, so that oil introduced from the outside into the housing is flown from the one side of the pump accommodating chamber to the gear accommodating chamber via the other side of the pump accommodating chamber, and then is discharged to the outside from the gear accommodating chamber.

2. The pump unit according to claim 1, wherein the housing includes a housing main body with an opening which is communicated with the pump accommodating chamber and through which the first and the second hydraulic pump main bodies can be inserted, and a plate member which is removably coupled to the housing main body so as to close the opening and in which suction/discharge passages to the first and the second hydraulic pump main bodies are formed,
   the supporting wall is integrally formed with the partition wall, and
   a communicating passage which fluidly communicates the one side with the other side of the pump accommodating chamber is formed so as to be positioned between a free end of the supporting wall and the plate member.

3. The pump unit according to claim 2, wherein the communicating passage is formed by a groove provided at the free end of the supporting wall in such a manner to be opened toward the plate member, and
   at least part of the free end of the supporting wall is configured to come in contact with the plate member.

4. The pump unit according to claim 1, wherein the housing is configured to be supported by a supporting member in such a manner that the first and the second pump shafts extend along the horizontal direction, and
   the oil passage is provided at a position higher than the pump shafts in a state that the housing is supported by the supporting member.

5. The pump unit according to claim 1, further comprising:
a pair of control arms which are respectively coupled to the operational ends of the first and the second trunnion type movable swash plates; and
a pair of neutral return springs disposed between each of the pair of control arms and the housing in such a manner as to return the corresponding control arms to the neutral position.

6. The pump unit according to claim 5, wherein the first and the second hydraulic pump main bodies are respectively fluidly connected to a pair of hydraulic motor units which drives driving wheels and which are disposed away from the housing,
the pair of control arms are mechanically linked to a pair of right and left operating levers which are disposed near the vehicle driving seat, respectively, and
the pair of neutral return springs are so configured that they do not perform the neutral return action when the corresponding operating levers are operated in the vehicle forward travel direction and perform the neutral return action only when the corresponding operating levers are operated in the vehicle rearward travel direction.

7. The pump unit according to claim 6, further comprising:
movable pins provided at the pair of control arms; and
fixed pins disposed radially outwards of the movable pin with the corresponding operating axis as a reference,
wherein the neutral return spring is a helix spring which is directly or indirectly wrapped around the operational end of the trunnion type movable swash plate, the neutral return spring having a first end and a second end which extend radially outwards with the operating axis of the trunnion type movable swash plate as a reference, and
the neutral return spring is so configured that the first end and the second end engage the corresponding movable pin so as to hold the movable pin therebetween, and only one of the first end or the second end engages with the corresponding fixed pin.

8. A pump unit, comprising:
a housing which has an oil-storable inner space, the oil-storable inner space being divided into a pump accommodating chamber and a gear accommodating chamber by a partition wall;
a hydraulic pump main body accommodated in the pump accommodating chamber; and
a gear train accommodated in the gear accommodating chamber,
wherein the housing has an inlet port for introducing oil from the outside into the pump accommodating chamber, an oil passage for flowing the oil from the pump accommodating chamber into the gear accommodating chamber, and a discharge port for taking out the oil in the gear accommodating chamber to the outside.

9. A pump unit, comprising:
a housing which has an oil-storable inner space, the oil-storable inner space being divided into a pump accommodating chamber and a gear accommodating chamber by a partition wall;
a first and a second pump shafts supported by the housing so as to cross over the pump accommodating chamber and the gear accommodating chamber;
a first and a second hydraulic pump main bodies respectively supported by the first and the second pump shafts in such a manner as to be located in the pump accommodating chamber; and
a gear train accommodated in the gear accommodating chamber,
wherein the housing has an inlet port for introducing oil from the outside into the pump accommodating chamber, an oil passage for flowing the oil from the pump accommodating chamber into the gear accommodating chamber, and a discharge port for taking out the oil inside the gear housing chamber to the outside.

10. The pump unit according to claim 9, wherein the housing has a dividing wall dividing the pump accommodating chamber into a first pump space and a second pump space in such a manner that the both pump spaces are fluidly communicated with each other,
wherein the inlet port is disposed in one of the first and the second pump spaces, and
the oil passage is disposed in the other of the first and the second pump spaces.

11. The pump unit according to claim 9, wherein the pump accommodating chamber includes a first pump accommodating chamber and a second pump accommodating chamber which are respectively disposed at one side and the other side in the axial direction of the first and the second pump shafts with the gear accommodating chamber in-between,
the inlet port includes a first and a second inlet ports for introducing oil from the outside into the first pump accommodating chamber and the second pump accommodating chamber, respectively, and
the oil passage includes a first and a second passages for introducing the oil from the first and the second pump accommodating chambers into the gear accommodating chamber, respectively.

12. The pump unit according to claim 8, further comprising:
a PTO shaft supported by the housing; and
a PTO clutch mechanism which selectively connects/disconnects power transmission from the gear train to the PTO shaft,
wherein the housing has a PTO accommodating chamber which communicates with the gear accommodating chamber.

13. The pump unit according to claim 8, wherein the oil passage is provided at a position where the oil flow from the pump accommodating chamber into the gear accommodating chamber is performed through the use of pump action by at least one gear that forms the gear train.

14. The pump unit according to claim 8, further comprising:
an air intake mechanism which takes air into the gear accommodating chamber through the use of pump action by at least one gear that forms the gear train.

15. The pump unit according to claim 14, wherein the air intake mechanism is configured to utilize the pump action by a gear located at the lowermost position in a state that the pump unit is in a mounted condition, out of the gears that forms the gear train.

16. The pump unit according to claim 14, wherein the air intake mechanism has an air intake port provided in the housing in such a manner as to communicate the gear accommodating chamber with the outside, and a tubular member which has a base end connected to the air intake port, and the tubular member has a portion higher than the oil level of a reserve tank fluidly connected to the discharge port, in a state that the one gear is not rotated.

17. The pump unit according to claim 14, wherein the air intake mechanism has an air intake port provided in the housing in such a manner as to communicate the gear accommodating chamber with the outside, and a tubular member which has a base end connected to the air intake port, and a tip end of the tubular member is connected to an air layer of a reserve tank fluidly connected to the discharge port.

18. The pump unit according to claim 14, wherein the air intake mechanism has an air intake port provided in the housing in such a manner as to communicate the gear accommodating chamber with the outside, and a one-way valve that allows intake of air into the gear accommodating chamber via the air intake port while preventing outflow of oil from the gear accommodating chamber via the air intake port.

19. The pump unit according to claim 14, wherein the air intake mechanism has a filter which prevents a foreign matter from being sucked from the outside into the gear accommodating chamber.

* * * * *